United States Patent
Takumi et al.

(10) Patent No.: US 10,963,543 B2
(45) Date of Patent: Mar. 30, 2021

(54) SECURE COMMUNICATION BETWEEN OPERATING SYSTEM AND PROCESSES

(71) Applicant: Kabushiki Kaisha Toshiba, Minato-ku (JP)

(72) Inventors: Shinya Takumi, Kawasaki (JP); Yoshikazu Hanatani, Komae (JP); Hiroyoshi Haruki, Kawasaki (JP); Masanobu Koike, Tama (JP); Naoki Ogura, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 310 days.

(21) Appl. No.: 15/900,458

(22) Filed: Feb. 20, 2018

(65) Prior Publication Data
US 2019/0080059 A1    Mar. 14, 2019

(30) Foreign Application Priority Data

Sep. 11, 2017 (JP) .............................. JP2017-173995

(51) Int. Cl.
*G06F 21/30* (2013.01)
*G06F 21/60* (2013.01)
(Continued)

(52) U.S. Cl.
CPC .............. *G06F 21/30* (2013.01); *G06F 21/44* (2013.01); *G06F 21/604* (2013.01);
(Continued)

(58) Field of Classification Search
None
See application file for complete search history.

(56) References Cited

U.S. PATENT DOCUMENTS 6,226,383 B1 * 5/2001 Jablon .................. H04L 9/0844
380/30
7,581,243 B2   8/2009 Shigeeda
(Continued)

FOREIGN PATENT DOCUMENTS

JP   2002-533808 A   10/2002
JP   2005-217905     8/2005
(Continued)

OTHER PUBLICATIONS

No stated author; Intel—software developers manual—vol. 3D, part 4; 2016; Retrieved from the Internet https://www.intel.com/; pp. 1-224, as printed. (Year: 2016).*

(Continued)

*Primary Examiner* — Saleh Najjar
*Assistant Examiner* — Michael W Chao
(74) *Attorney, Agent, or Firm* — Oblon, McClelland, Maier & Neustadt, L.L.P.

(57) ABSTRACT

According to an embodiment, an information processing apparatus includes one or more processor. The processor is configured to run a process and a process manager to manage the process. The process includes a first key generator, a first authentication code generator, and a first output unit. The first key generator is configured to generate a first message authentication key by using process unique data assigned by the process manager. The first authentication code generator is configured to generate a first message authentication code by using the first message authentication key and a first message. The first output unit is configured to transmit the first message and the first message authentication code to the process manager.

8 Claims, 20 Drawing Sheets

(51) Int. Cl.
  *G06F 21/62* (2013.01)
  *G06F 21/44* (2013.01)
  *H04L 9/08* (2006.01)
  *G06F 21/64* (2013.01)
  *G06F 9/355* (2018.01)

(52) U.S. Cl.
  CPC ........ *G06F 21/606* (2013.01); *G06F 21/6209* (2013.01); *G06F 21/6281* (2013.01); *G06F 21/64* (2013.01); *H04L 9/0838* (2013.01); *H04L 9/0869* (2013.01); *G06F 9/3557* (2013.01); *G06F 2221/2141* (2013.01)

(56) References Cited

U.S. PATENT DOCUMENTS

| | | | | |
|---|---|---|---|---|
| 7,779,307 | B1* | 8/2010 | Favor | G06F 11/1407 |
| | | | | 714/38.1 |
| 8,571,221 | B2* | 10/2013 | Little | G06F 21/72 |
| | | | | 380/264 |
| 9,177,153 | B1* | 11/2015 | Perrig | G06F 21/57 |
| 9,465,955 | B1* | 10/2016 | Tidd | G06F 21/6218 |
| 9,813,303 | B1* | 11/2017 | Guigli | H04L 63/0807 |
| 10,708,049 | B2 | 7/2020 | De Atley | H04L 63/06 |
| 10,817,597 | B2* | 10/2020 | Tucker | G06F 21/6218 |
| 10,839,080 | B2* | 11/2020 | Khessib | G06F 13/4072 |
| 2003/0133568 | A1* | 7/2003 | Stein | H04L 9/0631 |
| | | | | 380/37 |
| 2004/0193876 | A1* | 9/2004 | Donley | H04L 63/1458 |
| | | | | 713/162 |
| 2005/0108498 | A1* | 5/2005 | Kaminaga | G06F 12/1408 |
| | | | | 711/209 |
| 2006/0117177 | A1* | 6/2006 | Buer | G06F 21/72 |
| | | | | 713/155 |
| 2006/0150256 | A1* | 7/2006 | Fanton | H04L 9/32 |
| | | | | 726/27 |
| 2007/0011429 | A1* | 1/2007 | Sangili | G06F 12/145 |
| | | | | 711/203 |
| 2010/0115286 | A1* | 5/2010 | Hawkes | H04L 9/0618 |
| | | | | 713/189 |
| 2012/0159184 | A1* | 6/2012 | Johnson | G06F 21/53 |
| | | | | 713/189 |
| 2013/0062401 | A1* | 3/2013 | Sheehan | G06F 9/468 |
| | | | | 235/375 |
| 2013/0275376 | A1* | 10/2013 | Hudlow | G07F 17/3241 |
| | | | | 707/639 |
| 2014/0373134 | A1 | 12/2014 | Yada | |
| 2015/0264077 | A1* | 9/2015 | Berger | H04L 63/1441 |
| | | | | 726/23 |
| 2016/0306750 | A1* | 10/2016 | Tucker | H04L 9/0869 |
| 2017/0075712 | A1* | 3/2017 | Krishna | G06F 8/61 |
| 2017/0177877 | A1* | 6/2017 | Suarez | G06F 16/188 |
| 2017/0180346 | A1* | 6/2017 | Suarez | G06F 8/71 |
| 2017/0288875 | A1* | 10/2017 | Xing | H04L 9/3242 |
| 2018/0046823 | A1* | 2/2018 | Durham | G06F 21/53 |
| 2018/0137299 | A1* | 5/2018 | Porter | H04L 63/08 |
| 2019/0026138 | A1* | 1/2019 | Cao | G06F 8/63 |
| 2019/0220590 | A1* | 7/2019 | De Jonge | H04L 9/0866 |

FOREIGN PATENT DOCUMENTS

| | | |
|---|---|---|
| JP | 2009-100394 A | 5/2009 |
| JP | 2013-191176 | 9/2013 |
| JP | 2016-162188 | 9/2016 |
| WO | WO 2015/162688 A1 | 10/2015 |

OTHER PUBLICATIONS

A Freier, et al. "The Secure Sockets Layer (SSL) Protocol Version 3.0", Internet Engineering Task Force (IETF), 2011, 67 pages.
T. Dierks, et al. "The Transport Layer Security (TLS) Protocol Version 1.2", Network Working Group, 2008, 104 pages.

\* cited by examiner

| pid | EXECUTION FILE | FILE OFFSET | SIZE | BASE ADDRESS | MAPPING FLAG |
|---|---|---|---|---|---|
| AAAA | /bin/test | 0 | 0×2000 | 0×0000555555554000 | EXECUTION/ READING PERMITTED |

US 10,963,543 B2

SECURE COMMUNICATION BETWEEN OPERATING SYSTEM AND PROCESSES

CROSS-REFERENCE TO RELATED APPLICATIONS

This application is based upon and claims the benefit of priority from Japanese Patent Application No. 2017-173995, filed on Sep. 11, 2017; the entire contents of which are incorporated herein by reference.

FIELD

Embodiments described herein relate generally to an information processing apparatus, an information processing method, and a computer program product.

BACKGROUND

Commonly-used computer systems execute processing in such a manner that an operating system (OS) for managing hardware resources operates, and processes managed by the OS. When an unexpected behavior occurs due to a bug in the processes or an attack to the processes and the impact of the behavior reaches the OS, there is a possibility that the impact reaches the entirety of the computer system. Therefore, the OS denies the processes access to the resources managed by the OS. Thus, for data exchange between the OS and the processes, a communication function between the OS and the processes is required. Furthermore, in order to protect communications between the OS and the processes and construct a safe system, the communication function needs to be provided with security functions, such as communication data integrity, prevention of spoofing, and concealing of communication data.

In communications between apparatuses in a commonly-used network, communications security is maintained by a secure sockets layer (SSL) and a transport layer security (TLS). On the other hand, for communications between an OS and a process, techniques such as SSL and TLS are not suitable in terms of settings that use these techniques, and there has been no technique for implementing a security function.

DETAILED DESCRIPTION

According to an embodiment, an information processing apparatus includes one or more processor. The processor is configured to run a process and a process manager to manage the process. The process includes a first key generator, a first authentication code generator, and a first output unit. The first key generator is configured to generate a first message authentication key by using process unique data assigned by the process manager. The first authentication code generator is configured to generate a first message authentication code by using the first message authentication key and a first message. The first output unit is configured to transmit the first message and the first message authentication code to the process manager.

Embodiments will be described in detail below with reference to the drawings. Note that, in the following description, the same reference signs denote constituent components having the same functions, and duplicate descriptions thereof are omitted as appropriate.

First Embodiment

Figure 1:
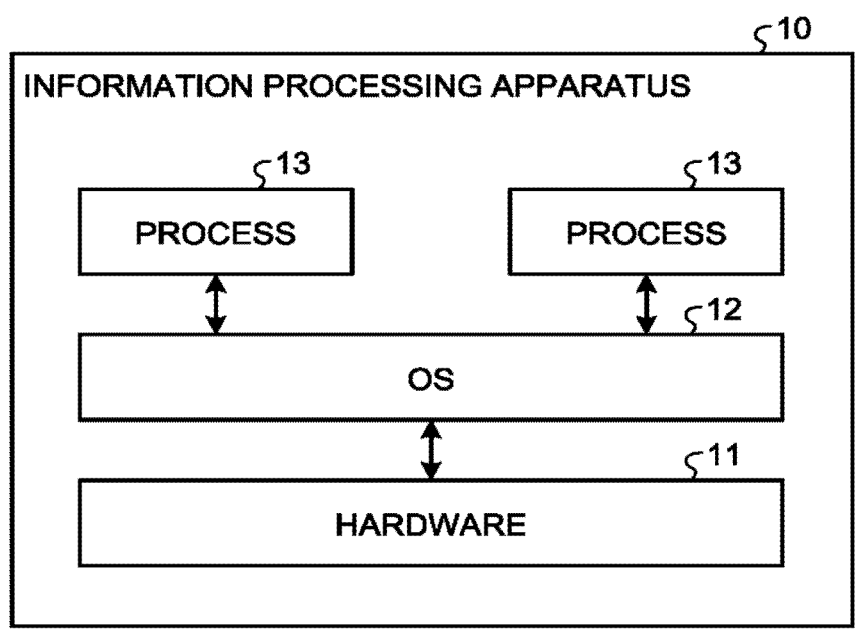
FIG. 1 is a block diagram illustrating a schematic configuration of an information processing apparatus.

FIG. 1 is a block diagram illustrating a schematic configuration of an information processing apparatus 10 according to the present embodiment. As illustrated in FIG. 1, the information processing apparatus 10 includes hardware 11, such as a processor circuit, a memory, and a storage, an OS 12 configured to operate a function of the hardware 11 (an example of a "process manager"), and processes 13 configured to operate by making use of a function of the OS 12. At least one of the processes 13 operates on the OS 12, and the OS 12 manages the processes 13 by assigning the processor circuit, the memory, and other modules as the hardware 11 to the processes 13 so that the processes 13 can operate concurrently. Note that a virtual machine monitor (VMM)/hypervisor, such as Xen, KVM, or Hyper-V, may operate between the OS 12 and the hardware 11, and the hardware 11 seen from the OS 12 may be a virtual hardware. Furthermore, it may be configured such that the process manager, such as the OS 12, is in the outside of the information processing apparatus 10, and the process 13 in the information processing apparatus 10 is managed by the external process manager.

Figure 2:
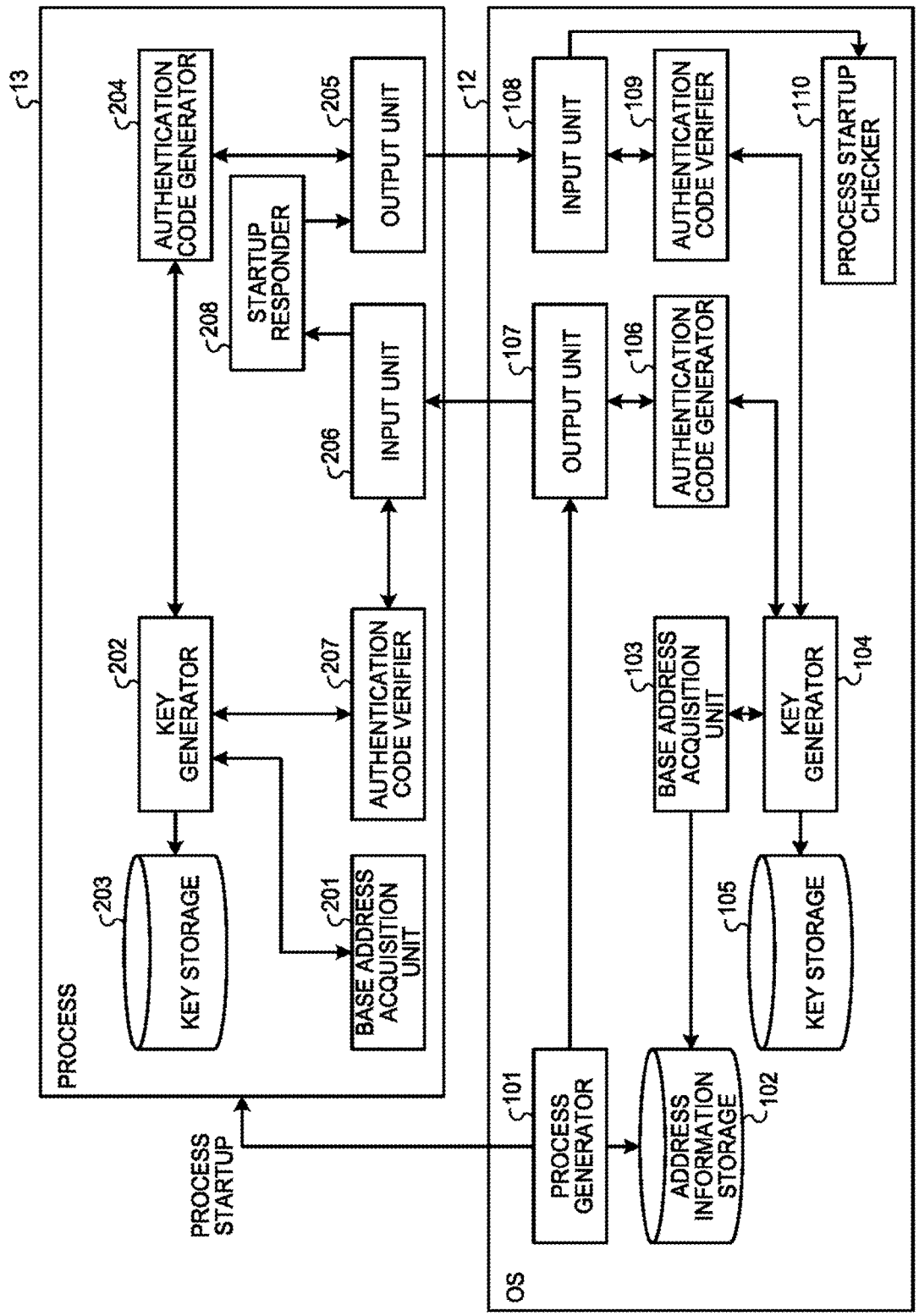
FIG. 2 is a block diagram illustrating a functional configuration example of an OS and a process according to a first embodiment.

FIG. 2 is a block diagram illustrating a functional configuration example of the OS 12 and the process 13. For start-up of the process 13, the OS 12 assigns an execution file to a memory to generate the process 13. The process 13 is managed by process identification information, that is, pid. When the process 13 starts up, the OS 12 and the process 13 perform communications for data exchange. FIG. 2 mainly illustrates an example of a functional configuration for performing the communications between the OS 12 and the process 13 safely.

First, the function of the OS 12 is described. As illustrated in FIG. 2, the OS 12 includes a process generator 101, an address information storage 102, a base address acquisition unit 103, a key generator 104, a key storage 105, an authentication code generator 106, an output unit 107, an input unit 108, an authentication code verifier 109, and a process startup checker 110.

The process generator 101 is configured to generate the process 13. For example, the process generator 101 sets a base address for mapping an execution file of the process 13 to a memory, generates address information including the set base address, and stores the information in the address information storage 102. Furthermore, the process generator 101 sends, to the output unit 107, a request to transmit a message for checking the startup of the generated process 13.

Figures 3, 4:
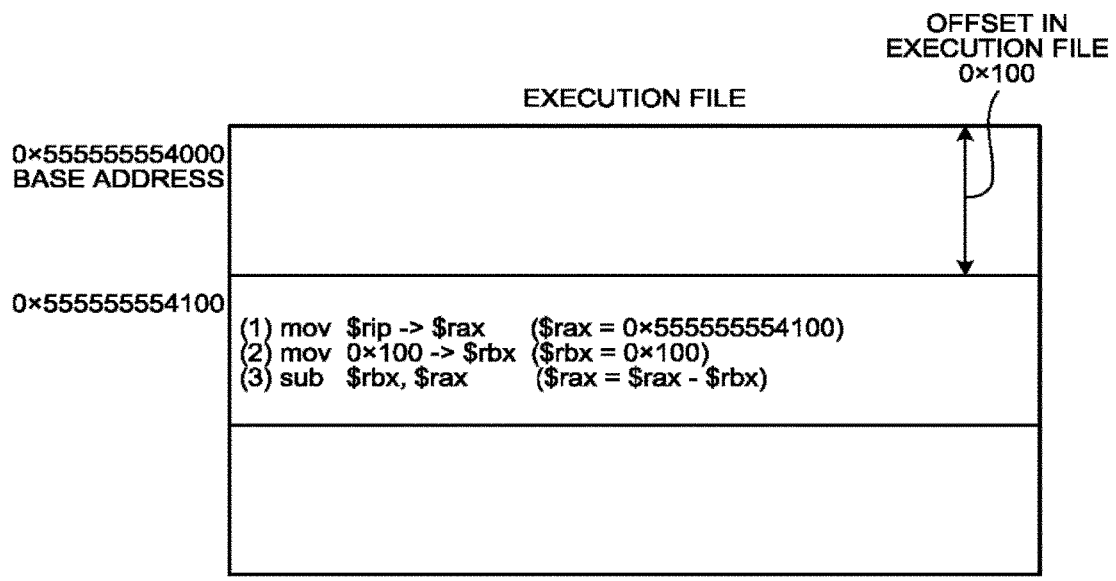
FIG. 3 is a diagram illustrating an example of address information.
FIG. 4 is a diagram for explaining an example of a method for acquiring a base address.

FIG. 3 is a diagram illustrating an example of address information stored in the address information storage 102. The address information illustrated in FIG. 3 is an example of address information generated when a code area of an execution file "/bin/test" is mapped to a memory. The address information includes items corresponding to the pid of the process 13, namely, "execution file", "file offset", "size", "base address", and "mapping flag". The "execution file" denotes a file name of an execution file mapped to a memory. The "file offset" denotes an offset value of the execution file to be mapped. The "size" denotes the size of the execution file to be mapped. The "base address" denotes a start address of the memory that is secured to map the execution file. The "mapping flag" denotes memory access authority. In the example in FIG. 3, the process generator 101 gives execution and reading authority for mapping the code area of the execution file "/bin/test", and ensures a memory space with a base address "0x0000555555554000" and a size "0x2000".

Here, examples of the memory include a mask read only memory (MaskROM), a programmable read only memory (PROM), an erasable programmable read only memory (EPROM), an electrically erasable programmable read only memory (EEPROM), a NAND flash memory, a NOR flash memory, a magnetoresistive random access memory (MRAM), a phase change random access memory (PRAM), a resistive random access memory (ReRAM), a ferroelectric random access memory (FeRAM), a static random access memory (SRAM), and a dynamic random access memory (DRAM). Furthermore, the memory may be other memories, such as a semiconductor memory and a quantum memory.

In the case where the execution file has a plurality of areas, such as a code area, a data area, and a stack area, a plurality of base addresses may be set. A memory address for mapping the execution file may be a virtual address or a physical address. Furthermore, the execution file is in a relocatable format, and the process generator 101 sets a base address with certain randomness. The OS 12 manages a base address, and accordingly, a base address of a process 13 that is producing and starting the base address cannot be wiretapped from another process 13.

The base address acquisition unit 103 searches, in response to a request from the key generator 104, the address information storage 102 by using, as a key, the pid of a process 13 targeted for communication, and acquires a base address corresponding to the communication target process 13 and returns the base address to the key generator 104. Note that, in the case where a plurality of base addresses are set for the communication target process 13, the kinds of the base addresses to be acquired are predetermined, such as a base address responding to a code area.

The key generator 104 generates, in response to a request from the authentication code generator 106 or the authentication code verifier 109, a message authentication key (an example of a "second message authentication key") for generating and verifying a later-mentioned message authentication code, by using the base address (an example of "process unique data") acquired by the base address acquisition unit 103. For example, using key derivation functions such as PBKDF2 and Argon2 alone or using the functions in combination, the key generator 104 inputs the base address acquired by the base address acquisition unit 103 to the key derivation functions to generate the message authentication key by a predetermined method. Furthermore, the key generator 104 may be configured to use HW key generation modules, such as a trusted platform module (TPM) and a hardware security module (HSM). The message authentication key generated by the key generator 104 is passed to the authentication code generator 106 or the authentication code verifier 109 as a request source, while, with corresponding to the pid, the message authentication key is stored in the key storage 105.

The authentication code generator 106 generates, in response to a request from the output unit 107, a message authentication code to be assigned to the message, by using the message authentication key generated by the key generator 104 and a message to be transmitted to the communication target process 13 (an example of a "second message"). For example, the authentication code generator 106 receives the pid of the communication target process 13 and the message from the output unit 107, and refers to the key storage 105 to check whether the message authentication key corresponding to the pid of the communication target process 13 is stored therein. Then, if the message authentication key corresponding to the pid of the communication target process 13 is stored, the authentication code generator 106 acquires the message authentication key. If the message authentication key is not stored, the authentication code generator 106 requests the key generator 104 to generate a message authentication key, and acquires the message authentication key from the key generator 104. Using the acquired message authentication key and the message received from the output unit 107, the authentication code generator 106 then generates a message authentication code, and assigns the message authentication code to the message and returns the message to the output unit 107.

The output unit 107 transmits, to the communication target process 13, the message assigned with the message authentication code generated by the authentication code generator 106. For example, when the output unit 107 receives a request to transmit a message for checking the startup of the process 13 from the process generator 101, the output unit 107 requests the authentication code generator 106 to generate a message authentication code using the pid of the process 13 as a message. When receiving the message assigned with the message authentication code from the authentication code generator 106, the output unit 107 then transmits the message assigned with the message authentication code to the process 13.

Note that, here, the case is mentioned as an example in which a startup check message transmitted in order to check the startup of the process 13, but, likewise, in the case of transmitting another message to the communication target process 13, the output unit 107 transmits the message assigned with the message authentication code. Also in this case, as described above, a message authentication code to be assigned to a message is generated by the authentication code generator 106 using the message authentication key generated using the base address, that is, unique data of the process 13.

The input unit 100 receives a message (an example of a "first message") assigned with a message authentication code (an example of a "first message authentication code") from the communication target process 13.

The authentication code verifier 109 verifies, in response to a request from the input unit 108, the message received by the input unit 108, by using the message authentication key generated by the key generator 104 and the message authentication code assigned to the message received by the input unit 108. For example, the authentication code verifier 109 receives, from the input unit 108, the pid of the communication target process 13 and the message assigned with the message authentication code, and refers to the key storage 105 to check whether the message authentication key corresponding to the pid of the communication target process 13 is stored therein. Then, if the message authentication key corresponding to the pid of the communication target process 13 is stored, the authentication code verifier 109 acquires the message authentication key. If the message authentication key is not stored, the authentication code verifier 109 requests the key generator 104 to generate a message authentication key, and acquires the message authentication key from the key generator 104. Using the acquired message authentication key and the message authentication code received from the input unit 108, the authentication code verifier 109 then verifies whether the message received by the input unit 108 is proper data transmitted from the communication target process 13, and returns the result of the verification to the input unit 108.

If the message that the input unit 108 has received from the process 13 is a later-mentioned startup response message, the input unit 108 passes, to the process startup checker 110, the startup response message received from the process 13 and the result of the verification by the authentication code verifier 109. The process startup checker 110 checks whether the process 13 generated by the process generator 101 has started up normally, based on the startup response message and the result of the verification by the authentication code verifier 109.

Next, the function of the process 13 is described. As illustrated in FIG. 2, the process 13 includes a base address acquisition unit 201, a key generator 202, a key storage 203, an authentication code generator 204, an output unit 205, an input unit 206, an authentication code verifier 207, and a startup responder 208.

The base address acquisition unit 201 acquires, in response to a request from the key generator 202, the base address set by the process generator 101 of the OS 12 during own-process generation, and returns the base address to the key generator 202. As described above, the base address is a start address of a memory that is secured to map an execution file of the own process to the memory. In the case where a plurality of base addresses, such as the base address of a code area, the base address of a data area, and the base address of a stack area, are set for the own process, it is only required to acquire a predetermined base address, for example, the base address corresponding to the code area.

FIG. 4 is a diagram for explaining an example of method of acquiring a base address by the base address acquisition unit 201 of the process 13, and the diagram illustrates an example of acquiring the base address from a program counter.

In (1) in FIG. 4, according to a mov instruction, a program counter is acquired from an rip register in which the program counter is stored, and stored in a rax register. The instruction to acquire the program counter may be any instruction, for example, a call instruction, as long as the instruction can execute a program counter. Furthermore, the register for storing the program counter may be a register other than the rax register, and may be stored in a memory.

In (2) in FIG. 4, according to a mov instruction, an offset 0x100 in a file of the instruction to acquire the program counter is stored in an rbx register. An address in the execution file is determined at compile time, and therefore, the offset in the execution file of the instruction to acquire the program counter can be calculated before execution of the execution file. Furthermore, the instruction to store the offset in the file of the instruction to acquire the program counter may be any instruction as long as the instruction is to store a constant value. The register to store the offset in the file of the instruction to acquire the program counter may be a register other than the rbx register, and may be stored in a memory.

In (3) in FIG. 4, according to a sub instruction, from the program counter acquired in (1), the execution file offset of the instruction to acquire the program counter is subtracted to acquire a base address. Besides the sub instruction, any instruction capable of performing subtraction between registers and memories may be applied.

Besides the above-described method, a base address may be acquired using a dynamic linker for solving symbol information of the execution file during execution and startup. In the case where the process calls a relocatable dynamic ink library, the dynamic link library also has a base address. The base address acquisition unit 201 of the process 13 may acquire the base address of the dynamic link library.

The key generator 202 generates, in response to a request from the authentication code generator 204 or the authentication code verifier 207, the same message authentication key (an example of a "first message authentication key") as the message authentication key generated by the key generator 104 of the OS 12, by using the base address (an example of "process unique data") acquired by the base address acquisition unit 201. For example, the key generator 202 uses the same key derivation function as that used by the key generator 104 of the OS 12, and inputs the base address acquired by the base address acquisition unit 201 to the key derivation function to generate a message authentication key. Furthermore, like the key generator 104 of the OS 12, the key generator 202 may be configured to use HW key generation modules, such as TPM and HSM. The message authentication key generated by the key generator 202 is passed to a request source, that is, the authentication code generator 204 or the authentication code verifier 207, and stored in the key storage 203.

In response to a request from the output unit 205, using the message authentication key generated by the key generator 202 and a message (an example of the "first message") to be transmitted to the OS 12, the authentication code generator 204 generates a message authentication code to be assigned to the message. For example, when receiving, from the output unit 205, the message to be transmitted to the OS 12, the authentication code generator 204 refers to the key storage 203 to check whether the message authentication key is stored therein. Then, if the message authentication key is stored in the key storage 203, the authentication code generator 204 acquires the message authentication key. If the message authentication key is not stored, the authentication code generator 204 requests the key generator 202 to generate a message authentication key, and acquires the message authentication key from the key generator 202. Using the acquired message authentication key and the message received from the output unit 205, the authentication code generator 204 then generates a message authentication code, and assigns the message authentication code to the message and returns the message to the output unit 205.

The output unit 205 transmits, to the OS 12, the message assigned with the message authentication code generated by the authentication code generator 204. For example, when receiving, from the later-mentioned startup responder 208, a request to transmit a startup response message, the output unit 205 requests the authentication code generator 204 to generate a message authentication code by using a message including a character string, such as "success" indicating a success in startup or "fail" indicating a failure in startup, added to the pid of the process 13, for example. When receiving the message assigned with the message authentication code from the authentication code generator 204, the output unit 205 then transmits the message assigned with the message authentication code to the OS 12. The contents and format of this startup response message do not matter, so long as whether the startup has succeeded or failed can be distinguished by the message.

Note that an example is described herein in which a startup response message is transmitted, but, also in the case of transmitting another message to the OS 12, the output unit 205 transmits the message assigned with the message authentication code. Also in this case, as described above, the authentication code generator 204 generates a message authentication code to be assigned to a message, by using the message authentication key generated using the base address, that is, unique data of the process 13.

The input unit 206 receives a message (an example of a "second message") assigned with a message authentication code (an example of a "second message authentication code") from the OS 12.

The authentication code verifier 207 verifies, in response to a request from the input unit 206, the message received by the input unit 206, by using the message authentication key generated by the key generator 202 and the message authentication code assigned to the message received by the input unit 206. For example, when receiving the message assigned with the message authentication code from the input unit 206, the authentication code verifier 207 refers to the key storage 203 to check whether the message authentication key is stored therein. Then, if the message authentication key is red in the key storage 203, the authentication code verifier 207 acquires the message authentication key. If the message authentication key is not stored, the authentication code verifier 207 requests the key generator 202 to generate a message authentication key, and thus acquires the message authentication key from the key generator 202. Using the acquired message authentication key and the message authentication code received from the input unit 206, the authentication code verifier 207 then verifies whether the message received by the input unit 206 is proper data transmitted from the OS 12, and returns the result of the verification to the input unit 206.

If the message that the input unit 206 has received from the OS 12 is a startup check message, the input unit 206 passes, to the startup responder 208, the startup check message received from the OS 12 and the result of the verification by the authentication code verifier 207. In order to notify the OS 12 whether the startup of the process 13 has succeeded, the startup responder 208 requests the output unit 205 to transmit the above-mentioned startup response message.

As described above, in the information processing apparatus 10 according to the present embodiment, when communications are carried cut between the OS 12 and the process 13, the same message authentication key is generated in both the OS 12 and the process 13 by using a base address, that is, unique data assigned to the process 13 by the OS 12, and, using this message authentication key, a message authentication code is generated and a message is verified. Thus, secure communications between the OS 12 and the process 13 can be established. Note that, although FIG. 2 illustrates only the one process 13, a plurality of processes 13 may communicate with the OS 12.

Next, assuming a situation in which the OS 12 transmits a startup check message to the process 13 during startup of the process 13 and, as a response thereto, the process 13 transmits a startup response message to the OS 12, the operation of the information processing apparatus 10 according to the present embodiment is described following a flowchart.

Figure 5:
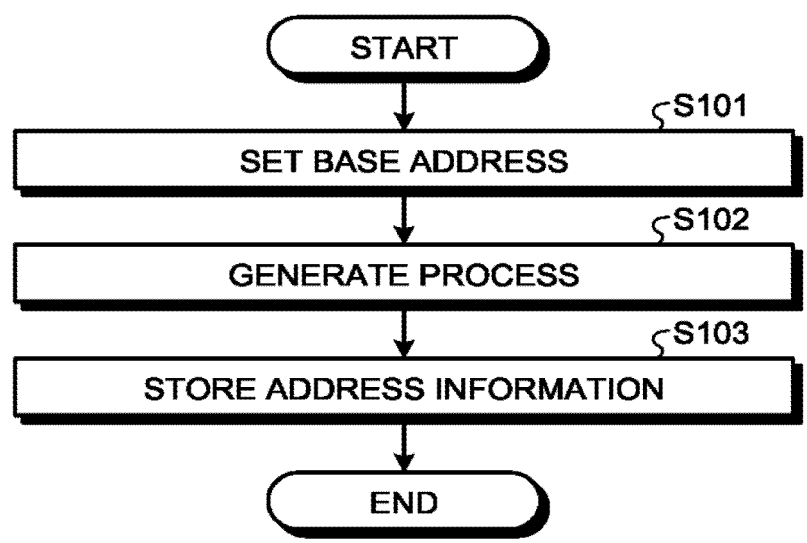
FIG. 5 is a flowchart illustrating an example of a processing procedure performed by a process generator.

First, processing by the process generator 101 of the OS 12 is described. FIG. 5 is a flowchart illustrating an example of a processing procedure performed by the process generator 101. A series of processing illustrated by the flowchart in FIG. 5 is initiated when a request to generate a process 13 based on a relocatable execution file is made.

When a request to generate a process 13 based on a relocatable execution file is made, the process generator 101 sets a base address for mapping the execution file to memory (Step S101). Based on the base address set at Step S101, the process generator 101 then maps the execution file to the memory to generate the process 13 (Step S102). Furthermore, the process generator 101 generates address information of the process 13, including the base address set at Step S101, and stores the address information in the address information storage 102 (Step S103).

Figure 6:
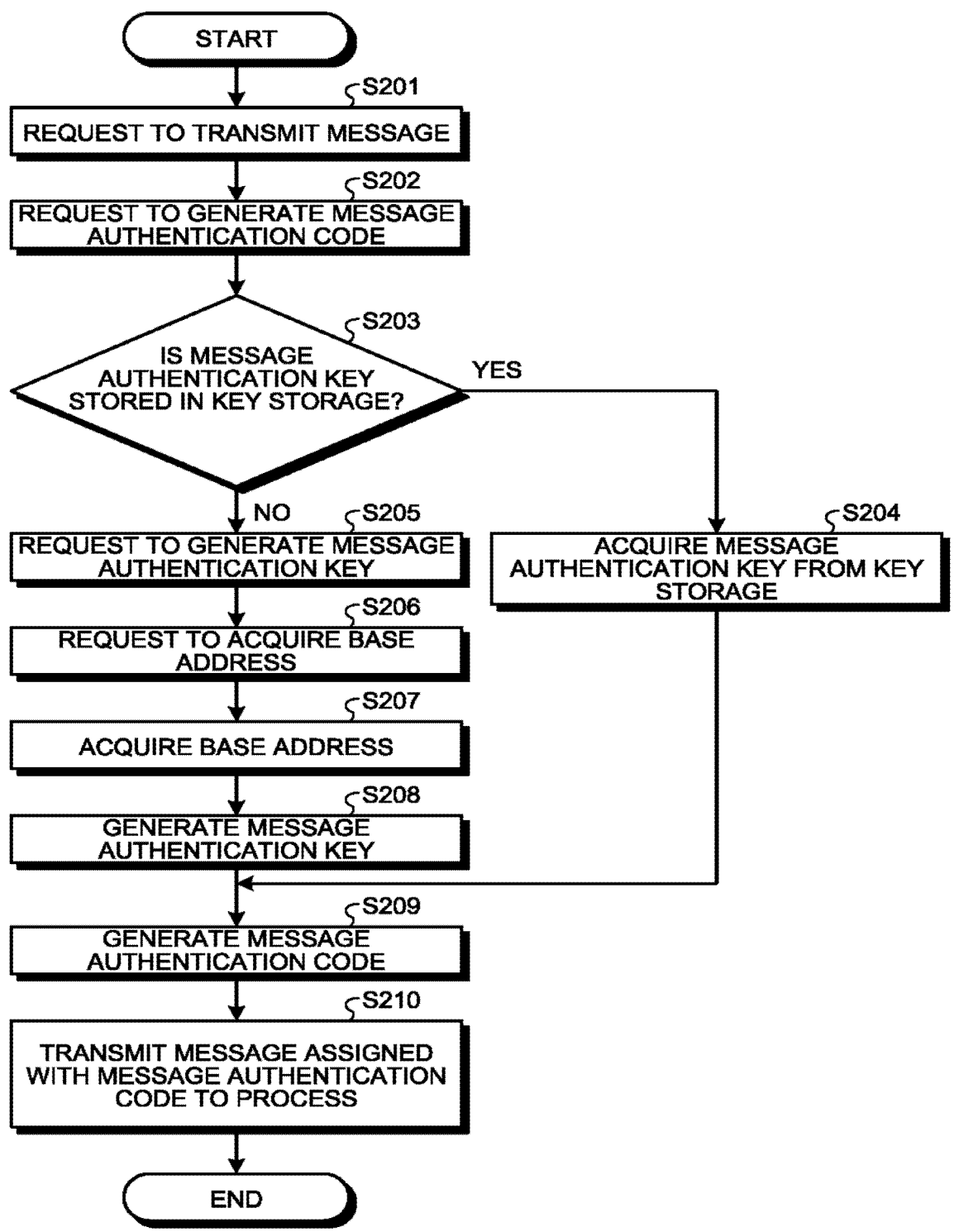
FIG. 6 is a flowchart illustrating an example of processing procedure in the OS during message transmission.

Next, processing performed during message transmission from the OS 12 to the process 13 is described. FIG. 6 is a flowchart illustrating an example of a processing procedure in the OS 12 during the message transmission.

First, in order to check whether the process 13 generated by the process generator 101 has started up normally, the process generator 101 passes the pid of the generated process 13 to the output unit 107, and requests the output unit 107 to transmit a message (Step S201). Note that the message transmission request may be made when the process 13 starts up or the process 13 issues a system call. Alternatively, the message transmission request may be made when an interrupt from the hardware 11 occurs or the condition of the hardware 11 is changed, or the message transmission request may be made at an arbitrary timing or by an arbitrary operation. Furthermore, it is assumed herein that the pid of the process 13 is used as a startup check message, but, instead of the pid, other information capable of identifying the process 13 may be used. In addition to the pid or information as a substitute for the pid, the startup check message may include context information, such as a startup time of the process 13 and positional information of the information processing apparatus 10.

In order to make the message transmission from the OS 12 to the process 13 secure, the output unit 107 passes, to the authentication code generator 106, a message to be transmitted to the process 13 targeted for communication, and requests the authentication code generator 106 to generate a message authentication code (Step S202). The authentication code generator 106 checks first whether a message authentication key corresponding to the communication target process 13 is stored in the key storage 105 (Step S203). Here, if the message authentication key corresponding to the communication target process 13 is stored in the key storage 105 (Yes at Step S203), the authentication code generator 106 acquires the message authentication key from the key storage 105 (Step S204).

In contrast, if the message authentication key corresponding to the communication target process 13 is not stored in the key storage 105 (No at Step S203), the authentication code generator 106 requests the key generator 104 to generate a message authentication key (Step S205). The key generator 104 requests the base address acquisition unit 103 to acquire a base address corresponding to the communication target process 13 (Step S206). The base address acquisition unit 103 searches the address information storage 102 to acquire the base address corresponding to the communication target process 13 (Step S207), and returns the acquired base address to the key generator 104. The key generator 104 generates a message authentication key by using the base address received from the base address acquisition unit 103 (Step S206), and returns the generated message authentication key to the authentication code generator 106 and stores the message authentication key in the key storage 105.

Next, using the message received from the output unit 107 at Step S202, and the message authentication key acquired from the key storage 105 at Step S204 or the message authentication key generated by the key generator 104 at Step S206, the authentication code generator 106 generates message authentication code (Step S209). The authentication code generator 106 then assigns the generated message authentication code to a message, and returns the message to the output unit 107. At this time, the message may be encrypted using the message authentication key. The output unit 107 transmits, to the communication target process 13, the message assigned with the message authentication code and received from the authentication code generator 106 (Step S210).

Figure 7:
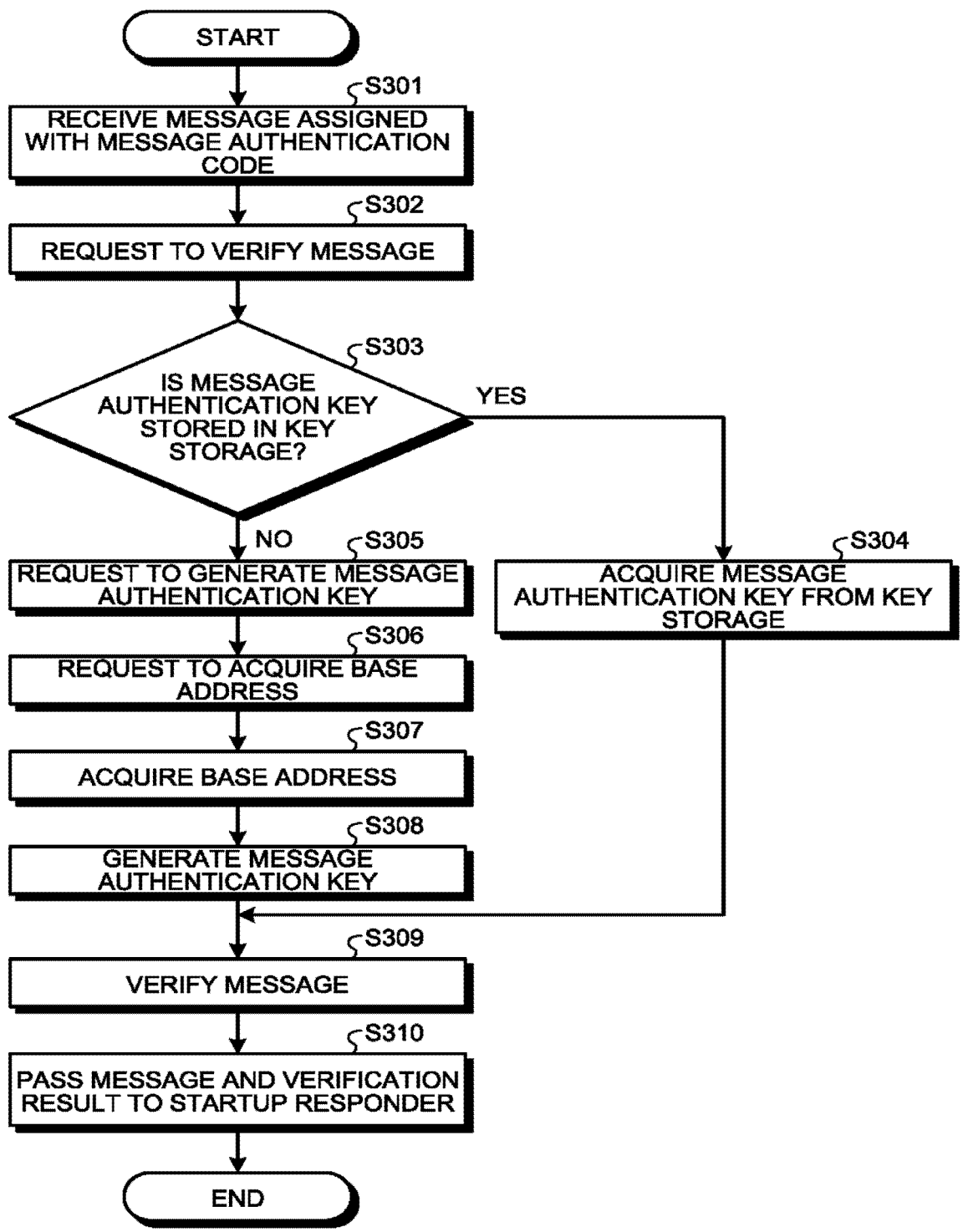
FIG. 7 is a flowchart illustrating an example of a processing procedure in the process during message reception.

Next, processing performed when the process 13 receives a message from the OS 12 is described. FIG. 7 is a flowchart illustrating an example of a processing procedure in the process 13 during the message reception.

When the input unit 206 of the process 13 receives the message assigned with the message authentication code and transmitted from the output unit 107 of the OS 12 (Step S301), the input unit 206 passes the message assigned with the message authentication code to the authentication code verifier 207 and requests the authentication code verifier 207 to verify the message in order to check the safety of the received message (Step S302). The authentication code verifier 207 checks first whether the same message authentication key as that in the OS 12 is stored in the key storage 203 (Step S303). Here, if the same message authentication key as that in the OS 12 is stored in the key storage 203 (Yes at Step S303), the authentication code verifier 207 acquires the message authentication key from the key storage 203 (Step S304).

In contrast, if the same message authentication key as that in the OS 12 is not stored in the key storage 203 (No at Step S303), the authentication code verifier 207 requests key generator 202 to generate a message authentication key (Step S305). The key generator 202 requests the base address acquisition unit 201 to acquire a base address (Step S306). The base address acquisition unit 201 acquires a base address, for example, from a program counter as described above (Step S307), and returns the acquired base address to the key generator 202. The key generator 202 generates a message authentication key by using the base address received from the base address acquisition unit 201 (Step S308), and returns the generated message authentication key to the authentication code verifier 207 and stores the message authentication key in the key storage 203.

Next, using the message authentication code assigned to the message received from the input unit 206 at Step S302, and the message authentication key acquired from the key storage 203 at Step S304 or the message authentication key generated by the key generator 202 at Step S308, the authentication code verifier 207 verifies the message received from the input unit 206 at Step S302 (Step S309). Specifically, for example, using the message authentication key, the authentication code verifier 207 generates a message authentication code, based on the message received from the input unit 206, and checks whether the generated message authentication code matches the message authentication code assigned to the message, thereby checking whether the message received by the input unit 206 is proper data transmitted by the OS 12, and thus detects message falsification and masquerade. Note that, in the case where the message has been encrypted at the time of the verification, the message may be decoded with the message authentication key.

The authentication code verifier 207 returns, to the input unit 206, the result of the verification of the message received by the input unit 206. When receiving the verification result from the authentication code verifier 207, the input unit 206 passes the message and the verification result to the startup responder 208 (Step S310).

Figure 8:
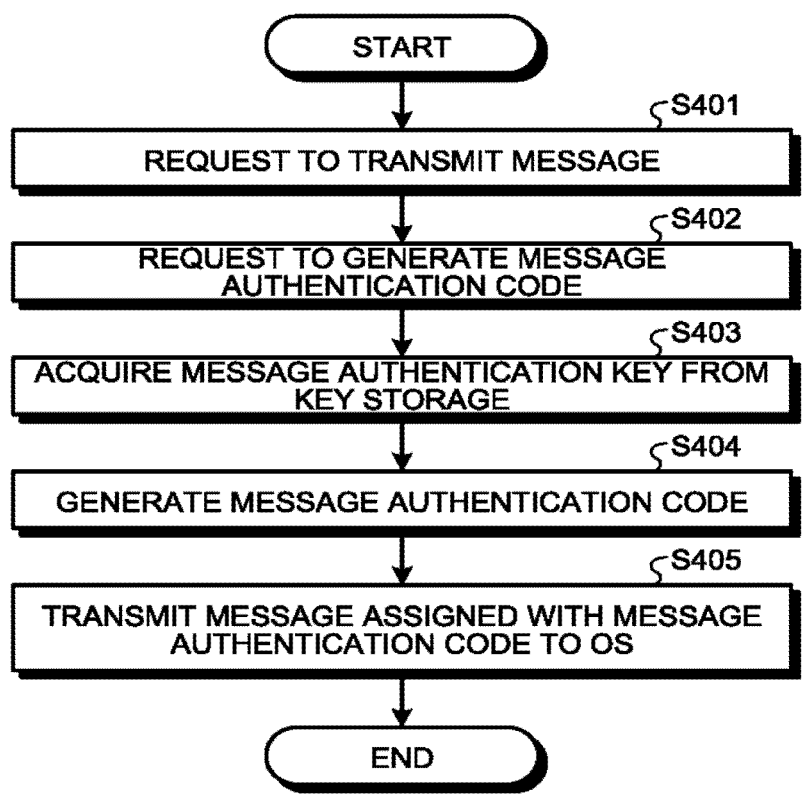
FIG. 8 is a flowchart illustrating an example of processing procedure in the process during message transmission.

Next, processing performed during message transmission from the process 13 to the OS 12 is described. FIG. 8 is a flowchart illustrating an example of a processing procedure in the process 13 during the message transmission.

In order to notify the OS 12 whether the process 13 has started up normally, first the startup responder 208 passes, to the output unit 205, the pid of the process 13 and information on the success or failure of the startup, and requests the output unit 205 to transmit a message (Step S401).

In order to make message transmission from the process 13 to the OS 12 secure, the output unit 205 passes, to the authentication code generator 204, a message to be transmitted to the OS 12, and requests the authentication code generator 204 to generate a message authentication code (Step S402). In the same manner as the above-mentioned authentication code verifier 207, the authentication code generator 204 checks first whether the same message authentication key as that in the OS 12 is stored in the key storage 203. Here, during the reception of the startup check message, a message authentication key is generated and stored in the key storage 203. Therefore, the authentication code generator 204 acquires the message authentication key from the key storage 203 (Step S403).

Note that, in the case where the message that the output unit 205 transmits to the OS 12 is not a response message such as a startup response message that is a response to a startup check message, but a message that the process 13 initiatively transmits to the OS 12, the same message authentication key as that in the OS 12 may not be stored in the key storage 203. In this case, as is the case in the above-mentioned example, it is only required that the authentication code generator 204 requests the key generator 202 to generate a message authentication key, and receives, from the key generator 202, the message authentication key that the key generator 202 generates using the base address acquired by the base address acquisition unit 201.

Next, using the message received from the output unit 205 at Step S402 and the message authentication key acquired from the key storage 203 at Step S403, the authentication code generator 204 generates a message authentication code (Step S404). The authentication code generator 204 then assigns the generated message authentication code to the message, and returns the message to the output unit 205. At this time, the message may be encrypted using the message authentication key. The output unit 205 transmits, to the OS 12, the message assigned with the message authentication code and received from the authentication code generator 204 (Step S405).

Figure 9:
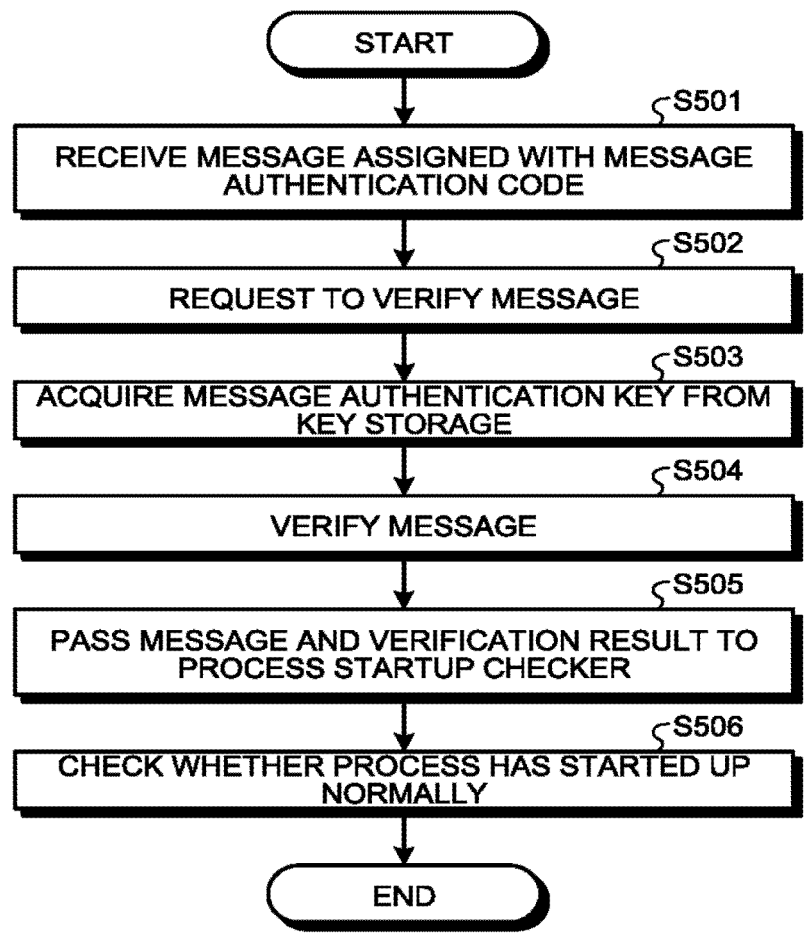
FIG. 9 is a flowchart illustrating an example of a processing procedure in the OS during message reception.

Next, processing performed when the OS 12 receives a message from the process 13 is described. FIG. 9 is a flowchart illustrating an example of a processing procedure in the OS 12 during the message reception.

When the input unit 108 of the OS 12 receives the message assigned with the message authentication code and transmitted from the output unit 205 of the process 13 (Step S501), the input unit 108 passes the message assigned with the message authentication code to the authentication code verifier 109 and requests e authentication code verifier 109 to verify the message in order to check the safety of the received message (Step S502). In the same manner as the above-mentioned authentication code generator 106, the authentication code verifier 109 checks first whether the message authentication key corresponding to the pid of the process 13 (the communication target process 13) having transmitted the message is stored in the key storage 105. Here, during the transmission of the startup check message, a message authentication key is generated and stored in the key storage 105. Therefore, the authentication code verifier 109 acquires the message authentication key from the key storage 105 (Step S503).

Note that, in the case where the message that the input unit 108 receives from the process 13 is not a response message, but a message that the process 13 initiatively transmits to the OS 12, the message authentication key corresponding to the pid of the process 13 may not be stored in the key storage 105. In this case, as is the case in the above-mentioned example, it is only required that the authentication code verifier 109 requests the key generator 104 to generate a message authentication key, and receives, from the key generator 104, the message authentication key that the key generator 104 generates using the base address acquired by the base address acquisition unit 103.

Next, using the message authentication code assigned to the message received from the input unit 108 at Step S502 and the message authentication key acquired from the key storage 105 at Step S503, the authentication code verifier 109 verifies the message received from the input unit 108 at Step S502 (Step S504). Specifically, for example, using the message authentication key, the authentication code verifier 109 generates a message authentication code, based on the message received from the input unit 108, and checks whether the generated message authentication code matches the message authentication code assigned to the message, thereby checking whether the message received by the input unit 108 is proper data transmitted by the process 13, and thus detects message falsification and masquerade Note that, in the case where the message has been encrypted at the time of the verification, the message may be decoded with the message authentication key. Furthermore, in addition to the verification by the authentication code verifier 109, processing for detecting message falsification and masquerade may be carried out by checking whether information identifying the process 13, such as the pid thereof, and included in the message transmitted by the output unit 107 matches information identifying the process 13, such as the pid thereof, and included in the message transmitted from the process 13 as a response to the above-mentioned message and received by the input unit 108.

The authentication code verifier 109 returns, to the input unit 108, the result of the verification of the message received by the input unit 108. When receiving the verification result from the authentication code verifier 109, the input unit 108 passes the message and the verification result to the process startup checker 110 (Step S505). Based on the message received from the input unit 108 and the verification result, the process startup checker 110 checks whether the process 13 generated by the process generator 101 has started up normally (Step S506).

As described above in detail by using specific examples, according to the present embodiment, the same message authentication key is generated in the OS 12 and the process 13 by using a base address, that is, process unique data assigned to the process 13 by the OS 12. Then, when communications are carried out between the OS 12 and the process 13, a message authentication code is generated using this message authentication key, and a message is verified using the message authentication code. Thus, a security function for communications between the OS 12 and the process 13 can be implemented, thereby protecting the process 13.

In particular, in the present embodiment, a base address, that is, process unique data assigned to the process 13 by the OS 12 is used for generation of a message authentication key, and therefore, the same message authentication key can be generated in the OS 12 and the process 13, without authenticated key exchange processing which is required in SSL and TLS, that is, widely-used techniques for implementing secure communications between apparatuses in commonly-used networks. Therefore, communication overhead associated with the authenticated key exchange processing can be reduced. Furthermore, a key does not need to be embedded beforehand in an image of the OS 12 or in the inside of an execution file to serve as a base for the process 13, and therefore, it is not necessary to consider attacks of leakage or falsification of a key embedded in an image of the OS 12 that is stored in the storage or embedded in the inside of the execution file to serve as a base for the process 13.

Modification

Next, a modification of the above-mentioned first embodiment is described. The present modification implements secure communications between the OS 12 and a process 13 that performs white list execution control. The white list execution control is a technique for, based on a list (white list) of execution files permitted to be executed, preventing the startup of an execution file not listed in the white list. In the present modification, the OS 12 detects the startup of a process 13 based on an execution file, while, in the process 13 that performs the white list execution control, it is determined whether to permit execution of the process 13 whose startup has been detected. Hereinafter, among processes 13 managed by the OS 12, a process 13 that performs the white list execution control is denoted as a management process 13, and a process 13 whose startup has been detected is denoted as a startup process 13B.

Figure 10:
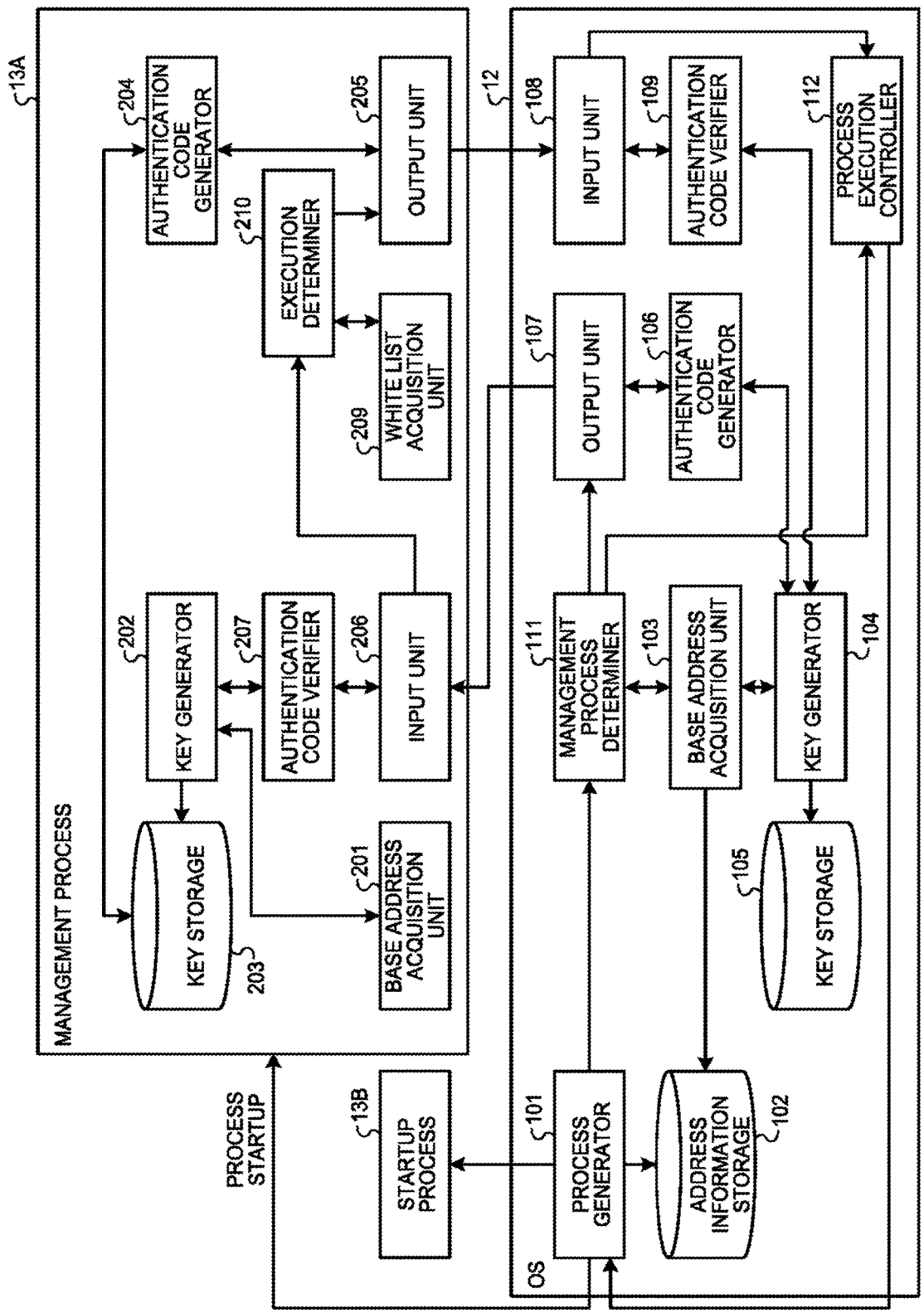
FIG. 10 is a block diagram illustrating a functional configuration example of an OS and a management process according to a modification.

FIG. 10 is a block diagram illustrating a functional configuration example of the OS 12 and the management process 13A according to the present modification. Compared with the configuration example illustrated in FIG. 2, a management process determiner 111 is added to the OS 12, and the process startup checker 110 is replaced with a process execution controller 112. Furthermore, a white list acquisition unit 209 is added to the management process 13A that communicates with the OS 12 to determine execution of the startup process 13B, and the startup responder 208 is replaced with an execution determiner 210. Note that the configuration of the startup process 13B is the same as the configuration of the process 13 illustrated in FIG. 2, and illustration thereof is therefore omitted.

The management process determiner 111 determines whether a process 13 generated by the process generator 101 is the management process 13A. If the process 13 is not the management process 13A, the management process determiner 111 determines whether the management process 13A has already started up.

If the management process determiner 111 determines that a process 13 generated by the process generator 101 is not the management process 13A but the startup process 13B, and the management process 13A has already started up, the process execution controller 112 controls execution of the startup process 13B according to the determination result by the execution determiner 210 of the management process 13A.

The white list acquisition unit 209 acquires a list (white list) of execution files permitted to be executed.

Based on the white list acquired by the white list acquisition unit 209, the execution determiner 210 determines whether to permit execution of the startup process 13B.

Figure 11:
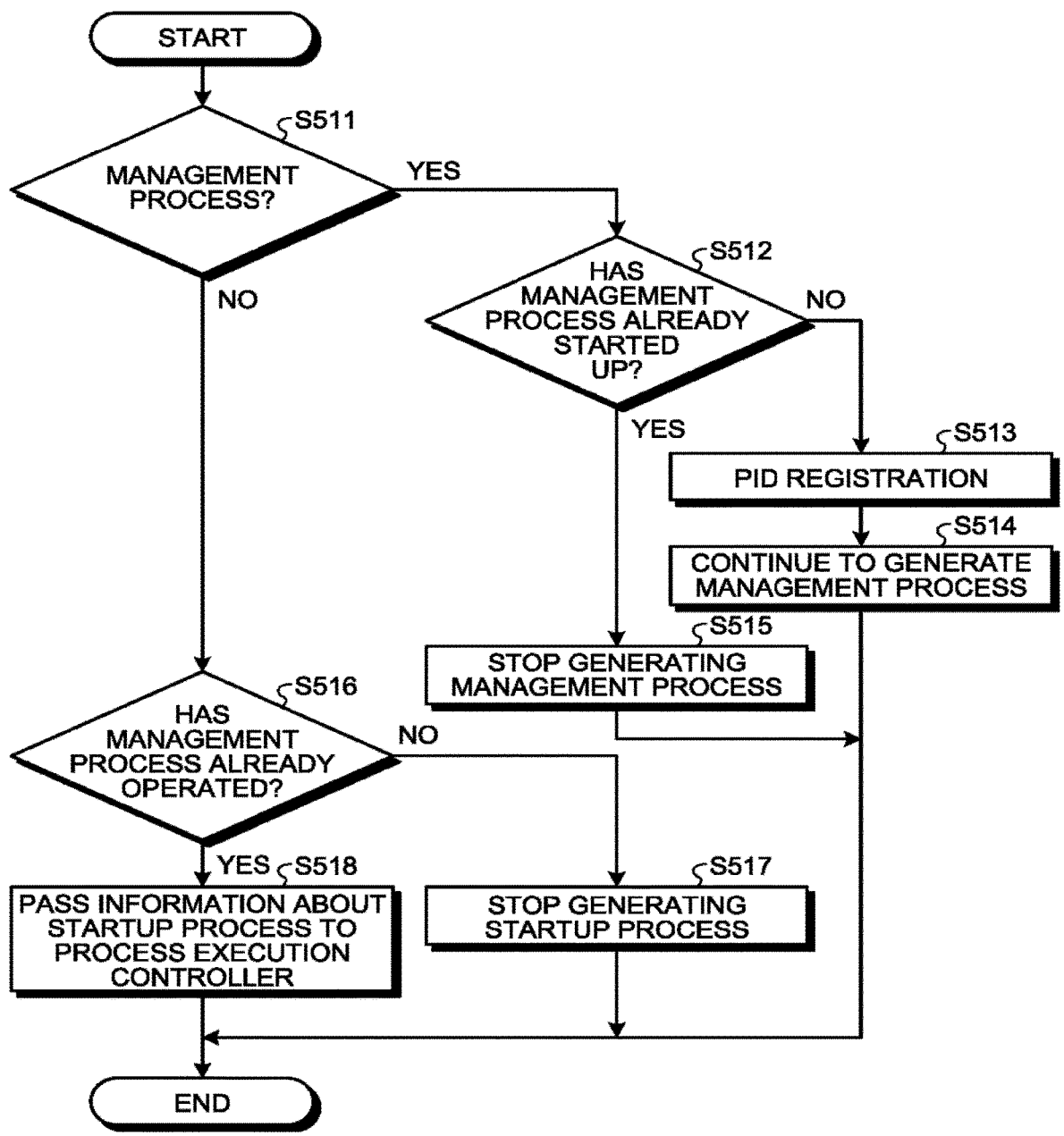
FIG. 11 is a flowchart illustrating an example of a processing procedure performed by a management process determiner.

FIG. 11 is a flowchart illustrating an example of a processing procedure performed by the management process determiner 111. The management process determiner 111 possesses beforehand the path name and hash value of an execution file of the management process 13A. The path name of the execution file may be formed of a set of an inode number and a device number, and the contents and format of the path name do not matter, so long as the path name has information capable of uniquely identifying the file.

In the present modification, when starting generation processing in response to a request to generate a process 13, the process generator 101 passes, to the management process determiner 111, the path name of an execution file of the process 13 to be generated. The management process determiner 111 calculates the hash value of the execution file identified using the path name received from the process generator 101, and checks whether the obtained hash value matches the hash value possessed beforehand, thereby determining whether the process 13 generated by the process generator 101 is the management process 13A (Step S511).

If determining that the process 13 generated by the process generator 101 is the management process 13A (Yes at Step S511), the management process determiner 111 checks whether the management process 13A has already started up (Step S512). Then, if the management process 13A has not started up (No at Step S512), the management process determiner 111 records the pid of the management process on the base address acquisition unit 103 (Step S513). Here, information registered in the base address acquisition unit 103 may be information other than the pid, so long as the information allows identification of the management process 13A. The management process determiner 111 then returns the processing to the process generator 101, thereby making the process generator 101 continue to generate the management process 13A (Step S514).

In contrast, if the management process 13A has already started up (Yes at Step S512), the management process determiner 111 returns the processing to the process generator 101 without performing any processing such as pid registration, and makes the process generator 101 stop the generation of the management process 13A (Step S515).

If determining that the process 13 generated by the process generator 101 is not the management process 13A but the startup process 13B (No at Step S511), the management process determiner 111 checks whether the management process 13A has already started up (Step S516). Then, if the management process 13A has not started up yet (No at Step S516), the management process determiner 111 returns the processing to the process generator 101, and makes the process generator 101 stop the generation of the startup process 13B (Step S517). Note that, in the present modification, a configuration that inhibits all the startup processes 13B from being executed before startup of the management process 13A is employed, but, a configuration that permits execution of the startup process 13B even when the management process 13A has not started up may be employed. In this configuration, if a determination result is No at Step S516, the management process determiner 111 returns the processing to the process generator 101, and makes the process generator 101 continue to generate the startup process 13B.

In contrast, if the management process 13A has already started up (Yes at Step S516), the management process determiner 111 passes, to the process execution controller 112, information about the startup process 13B, such as the pid of the startup process 13B and the path name of the execution file of the startup process 13B (Step S518), and terminates the processing. In this case, in order to inquire whether the startup process 13B is permitted to be executed, the process execution controller 112 transmits, to the output unit 107, the pid of the startup process 13B and the path name of the execution file of the startup process 13B, and requests the output unit 107 to transmit a message to the management process 13A. The output unit 107 treats the pid of the startup process 13B and the path name of the execution file of the startup process 13B as the message, and, as is the case in the above-mentioned first embodiment, transmits the message assigned with the message authentication code to the management process 13A. Note that the path name of the execution file may be formed of a set of an inode number and a device number, and the contents and format of the path name do not matter, so long as the path name has information capable of uniquely identifying the execution file of the startup process 13B. Furthermore, the message to be transmitted to the management process 13A may include context information, such as time, a user ID, a group ID, the number of executions, and a location.

Next, a processing procedure in the OS 12 when a message is transmitted to the management process 13A is described. Note that the processing procedure described below is the same as the above-mentioned processing procedure described using the flowchart in FIG. 6, except that the message transmission request is made not by the process generator 101 but by the process execution controller 112, and the message to be transmitted includes the pid of the startup process 13B and the path name of an execution file of the startup process 13B.

First, in order to check whether the startup process 13B is permitted to be executed, the process execution controller 112 passes the pid of the startup process 13B and the path name of the execution file of the startup process 13B to the output unit 107, and requests the output unit 107 to transmit a message to the management process 13A.

In order to make the message transmission from the OS 12 to the management process 13A secure, the output unit 107 passes, to the authentication code generator 106, the message to be transmitted to the management process 13A, that is, the message including the pid of the startup process 13B and the path name of the execution file of the startup process 13B, and requests the authentication code generator 106 to generate a message authentication code.

First, the authentication code generator 106 checks whether a message authentication key corresponding to the management process 13A is stored in the key storage 105. If the message authentication key corresponding to the management process 13A is stored in the key storage 105, the authentication code generator 106 acquires the message authentication key corresponding to the management process 13A from the key storage 105. In contrast, if the message authentication key corresponding to the management process 13A is not stored in the key storage 105, the authentication code generator 106 requests the key generator 104 to generate a message authentication key.

The key generator 104 requests the base address acquisition unit 103 to acquire a base address corresponding to the management process 13A. The base address acquisition unit 103 searches the address information storage 102 by using, as a key, the pid registered by the management process determiner 111 during the startup of the management process 13A, and acquires the base address corresponding to the management process 13A and returns the base address to the key generator 104. The key generator 104 generates a message authentication key by using the base address received from the base address acquisition unit 103, and returns the generated message authentication key to the authentication code generator 106 and stores the message authentication key in the key storage 105.

Next, using the message received from the output unit 107, and the message authentication key acquired from the key storage 105 or the message authentication key generated by the key generator 104, the authentication code generator 106 generates a message authentication code. The authentication code generator 106 then assigns the generated message authentication code to the message, and returns the message to the output unit 107. At this time, the message may be encrypted using the message authentication key. The output unit 107 transmits, to the management process 13A, the message assigned with the message authentication code and received from the authentication code generator 106.

Next, a processing procedure performed in the management process 13A when a message is received from the OS 12 is described. Note that the processing procedure described below is the same as the above-mentioned processing procedure described using the flowchart in FIG. 7, except that the message to be received includes the pid of the startup process 13B and the path name of the execution file of the startup process 13B, and the message and a verification result are passed not to the startup responder 206, but to the execution determiner 210.

When receiving the message assigned with the message authentication code and transmitted from the output unit 107 of the OS 12, the input unit 206 of the management process 13A passes the message assigned with the message authentication code to the authentication code verifier 207 and requests the authentication code verifier 207 to verify the message in order to check the safety of the received message.

The authentication code verifier 207 checks first whether the same message authentication key as that of the OS 12 is stored in the key storage 203. Here, if the same message authentication key as that of the OS 12 is stored in the key storage 203, the authentication code verifier 207 acquires the message authentication key from the key storage 203. In contrast, if the same message authentication key as that of the OS 12 is not stored in the key storage 203, the authentication code verifier 207 requests the key generator 202 to generate a message authentication key.

The key generator 202 requests the base address acquisition unit 201 to acquire the base address. The base address acquisition unit 201 acquires a base address, for example, from a program counter as described above, and returns the acquired base address to the key generator 202. The key generator 202 generates a message authentication key by using the base address received from the base address acquisition unit 201, and returns the generated message authentication key to the authentication code verifier 207 and stores the message authentication key in the key storage 203.

Next, using the message authentication code assigned to the message received from the input unit 206, and the message authentication key acquired from the key storage 203 or the message authentication key generated by the key generator 202, the authentication code verifier 207 verifies the message received from the input unit 206. Specifically, for example, using the message authentication key, the authentication code verifier 207 generates a message authentication code, based on the message received from the input unit 206, and checks whether the generated message authentication code matches the message authentication code assigned to the message, thereby checking whether the message received by the input unit 206 is proper data transmitted by the OS 12, and thus detects message falsification and masquerade. Note that, in the case where the message has been encrypted at the time of the verification, the message may be decoded with the message authentication key.

The authentication code verifier 207 returns the result of the verification of the message received by the input unit 206 to the input unit 206. When receiving the verification result from the authentication code verifier 207, the input unit 206 passes the message and the verification result to the execution determiner 210.

Figure 12:
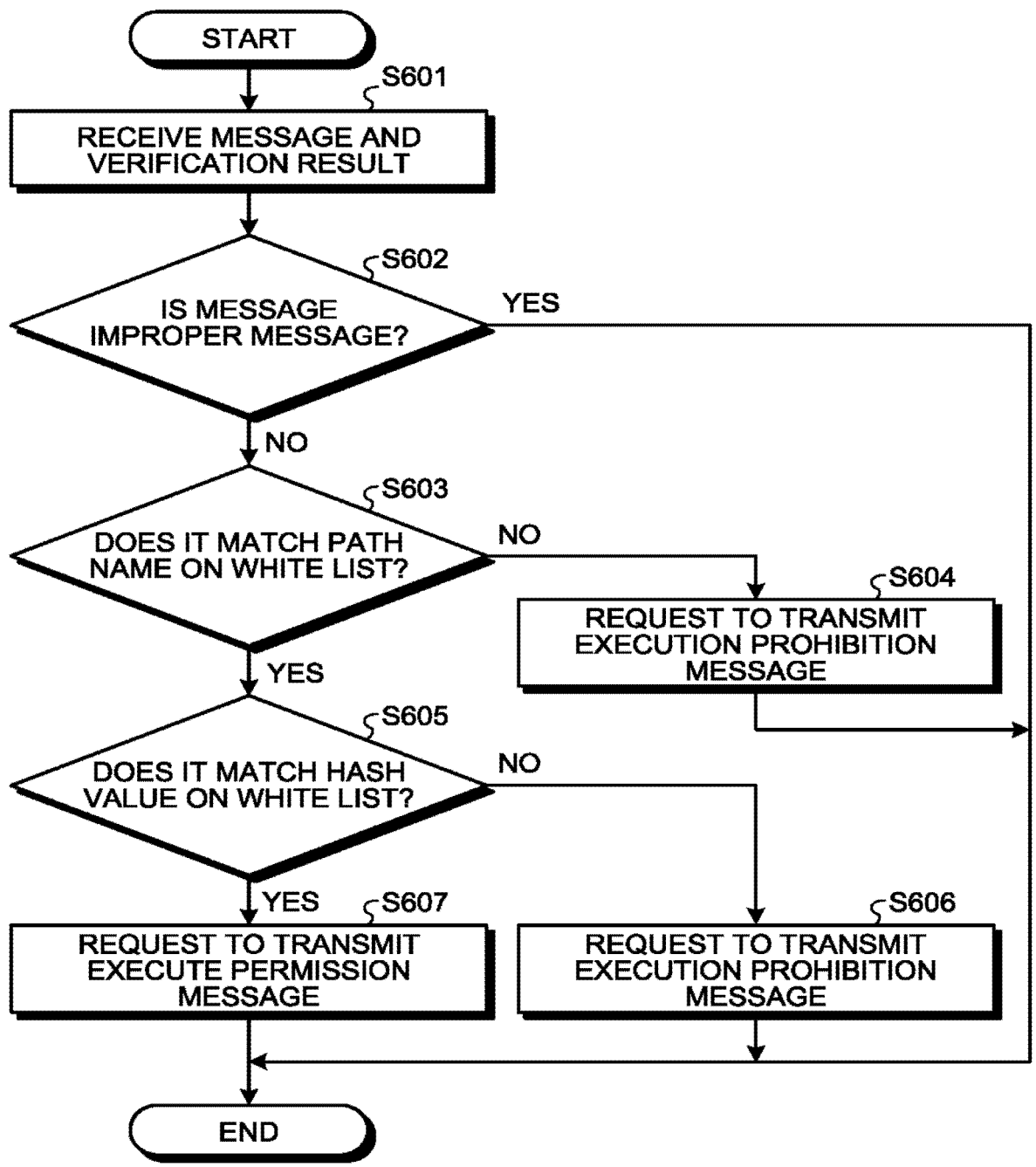
FIG. 12 is a flowchart illustrating an example of processing procedure performed by an execution determiner.

FIG. 12 is a flowchart illustrating an example of a processing procedure performed by the execution determiner 210. The execution determiner 210 receives, from the input unit 206, the message including the pid of the startup process 13B and the path name of the execution file of the startup process 13B, and the verification result of the message (Step S601). Then, the execution determiner 210 refers first to the verification result received from the input unit 206, and checks whether the message received from the input unit 206 is an improper message, such as falsified or masquerade message (Step S602).

Here, if the message received from the input unit 206 is an improper message (Yes at Step S602), the processing related to the message is terminated. In contrast, if the message received from the input unit 206 is not an improper message (No at Step S602), the execution determiner 210 receives a white list from the white list acquisition unit 209, and performs execution determination processing according to the white list.

The white list is present, for example, in a file format on a file system. The white list acquisition unit 209 can acquire the white list by reading the file of the white list. Alternatively, the white list may be embedded beforehand in the execution file of the management process 13A, and read during process startup. The white list is recorded, for example, in a table format with a column of the path name and hash value of the execution file of the process 13 permitted to be executed. The white list may have a configuration in which context information such as conditions for permitting and prohibiting the startup of the execution file, for example, time, a user ID, a group ID, the number of executions, and a location, is added to the column.

In the execution determination processing according to the white list, the execution determiner 210 checks first whether the path name of the execution file of the startup process 13B that is included in the message received from the input unit 206 matches a path name listed on the white list (Step S603). Here, if the path names do not match (No at Step S603), the execution determiner 210 determines that an unexpected execution file has started up, and accordingly requests the output unit 205 to transmit an execution prohibition message (Step S604), and terminates the processing.

In contrast, if the path names match (Yes at Step S603), then the execution determiner 210 reads the execution file of the startup process 13B to calculate the hash value of the execution file, and checks whether the obtained hash value matches a hash value listed on the white list (Step 605). Here, if the hash values do not match (No at Step S605), the execution determiner 210 determines that the execution file has been rewritten beyond expectation, and accordingly requests the output unit 205 to transmit an execution prohibition message (Step S606), and terminates the processing.

In contrast, if the hash values match (Yes at Step S605), the execution determiner 210 determines that a normal execution file has started up, and requests the output unit 205 to transmit an execution permission message (Step S607), and terminates the processing. Note that, in the case where context information has been added to the white list, the execution determiner 210 may acquire a context under execution in the information processing apparatus 10, and compare the context under execution with a context acquired from the white list. If the context under execution deviates from the context from the white list, the execution determiner 210 may request the output unit 205 to transmit an execution prohibition message.

The message that the execution determiner 210 requests the output unit 205 to transmit includes, for example, the pid of the startup process 13B that is a target for determination of whether to permit execution thereof, and information indicating whether to permit the execution, such as 0 if the message is an execution permission message, and −1 if the message is an execution prohibition message. This message may further include a randomly generated value and a message sequence number that increments every message. This message may further include the path name of the execution file of the startup process 13B that is a target for determination of whether to permit execution thereof. Furthermore, to this message, all messages received from the OS 12 may be added.

Next, a processing procedure in the management process 13A when a message is transmitted to the OS 12 is described. Note that the processing procedure described below is the same as the above-mentioned processing procedure described using the flowchart in FIG. 4, except that the message transmission request is made not by the startup responder 208 but by the execution determiner 210, and the message to be transmitted is an execution permission message or an execution prohibition message.

To notify the OS 12 whether the process 13 is permitted to be executed, the execution determiner 210 passes, to the output unit 205, the pid of the startup process 13B and information indicating whether the execution is permitted, and requests the output unit 205 to transmit an execution permission message or an execution prohibition message.

In order to make message transmission from the management process 13A to the OS 12 secure, the output unit 205 passes, to the authentication code generator 204, a message to be transmitted to the OS 12, and requests the authentication code generator 204 to generate a message authentication code. The authentication code generator 204 acquires a message authentication key from the key storage 203, and generates a message authentication code by using the message received from the output unit 205 and the message authentication key acquired from the key storage 203. The authentication code generator 204 then assigns the generated message authentication code to the message, and returns the message to the output unit 205. At this time, the message may be encrypted using the me-sage authentication key. The output unit 205 transmits, to the OS 12, the message assigned with the message authentication code and received from the authentication code generator 204.

Next, a processing procedure performed in the OS 12 when a message is received from the management process 13A is described. Note that the processing procedure described below is the same as the above-mentioned processing procedure described using the flowchart in FIG. 9, except that the message to be received is an execution permission message or an execution prohibition message, and the message and a verification result are passed not to the process startup checker 110 but to the process execution controller 112.

When receiving the message assigned with the message authentication code and transmitted from the output unit 205 of the management process 13A, the input unit 108 of the OS 12 passes the message assigned with the message authentication code to the authentication code verifier 109 and requests the authentication code verifier 109 to verify the message in order to check the safety of the received message. The authentication code verifier 109 acquires the message authentication key from the key storage 105, and verifies the message received from the input unit 108 by using the message authentication code assigned to the message received from the input unit 108 and the message authentication key acquired from the key storage 105. Note that, in the case where the message has been encrypted at the time of the verification, the message may be decoded with the message authentication key. Furthermore, in addition to the verification by the authentication code verifier 109, processing for detecting message falsification and masquerade may be carried out by checking whether information identifying the process 13, such as the pid thereof, and included in the message transmitted by the output unit 107 matches information identifying the process 13, such as the pid thereof, and included in the message transmitted from the process 13 as a response to the above-mentioned message and received by the input unit 108.

The authentication code verifier 109 returns, to the input unit 108, the result of the verification of the message received by the input unit 108. When receiving the verification result from the authentication code verifier 109, the input unit 108 passes the message and the verification result to the process execution controller 112. The process execution controller 112 controls execution of the startup process 13B, based on the message and the verification result that are received from the input unit 108.

Figure 13:
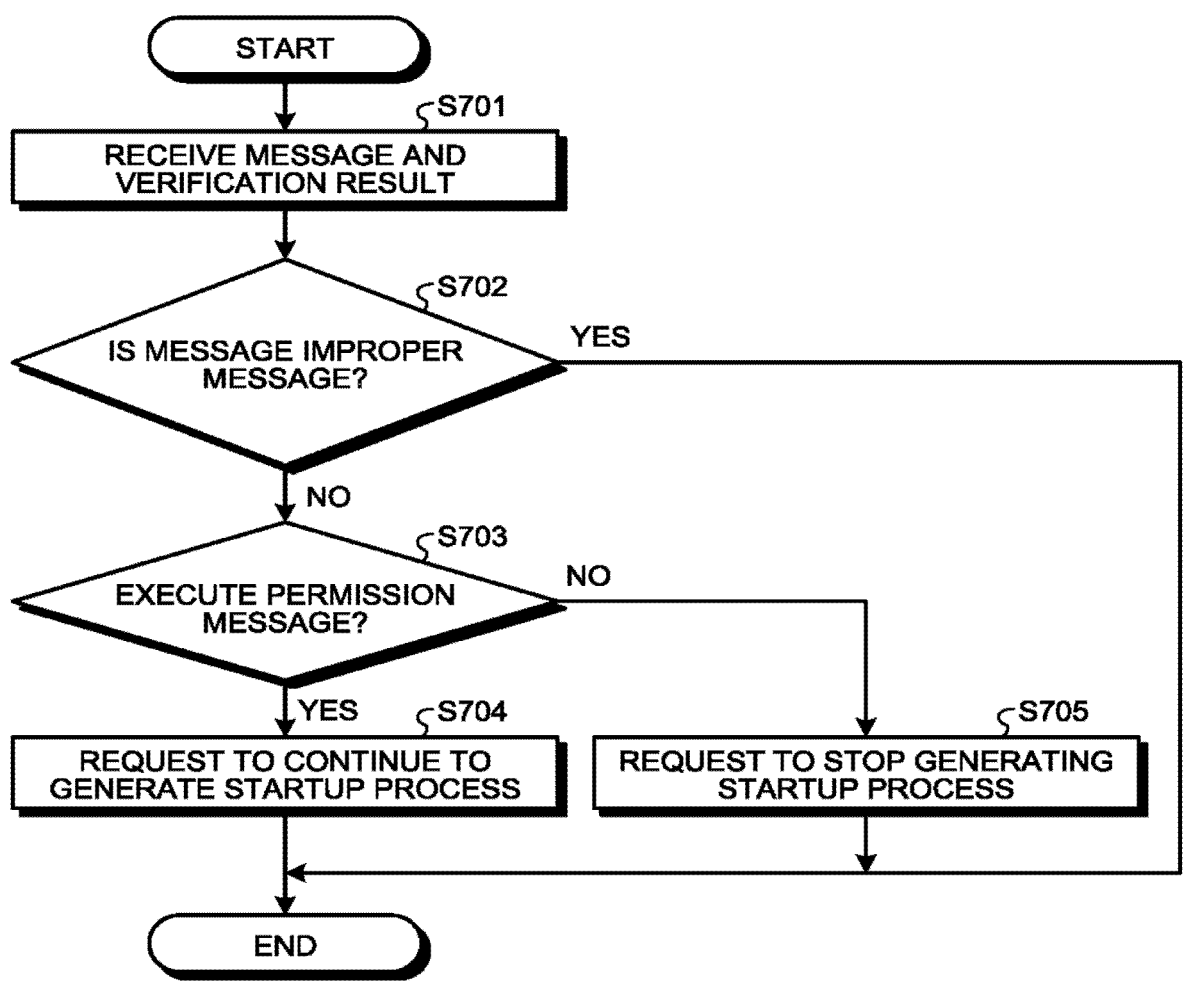
FIG. 13 is a flowchart illustrating an example of a processing procedure performed by a process execution controller.

FIG. 13 is a flowchart illustrating an example of a processing procedure performed by the process execution controller 112. The process execution controller 112 receives, from the input unit 108, the message including the pid of the startup process 13B and information indicating whether the execution is permitted, and the result of the verification of the message (Step S701). Then, the process execution controller 112 refers first to the verification result received from the input unit 108, and checks whether the message received from the input unit 108 is an improper message, such as falsified or masquerade message (Step S702).

Here, if the message received from the input unit 108 is an improper message (Yes at Step S702), the processing related to the message is terminated. In contrast, if the message received from the input unit 108 is not an improper message (No at Step S702), the process execution controller 112 refers to information included in the message received from the input unit 108 and indicating whether the execution is permitted, and thereby checks whether the message is an execution permission message (Step S703). Then, if the message received from the input unit 108 is an execution permission message (Yes at Step S703), the process execution controller 112 requests the process generator 101 to continue to generate the startup process 13B (Step S704), and terminates the processing. In contrast, if the message received from the input unit 108 is an execution prohibition message (No at Step S703), the process execution controller 112 requests the process generator 101 to stop generating the startup process 13B (Step S705), and terminates the processing.

Note that, in the case where an execution permission message or an execution prohibition message cannot be received from the management process 13A within a predetermined time (for example, one second) after the OS 12 transmits, to the management process 13A, a message for inquiring whether the startup process 13B is permitted to be executed, the process execution controller 112 may request the output unit 107 to resend the message for inquiring whether the startup process 13B is permitted to be executed. Furthermore, in the case where, although the message for inquiring whether the startup process 13B is permitted to be executed is resent a predetermined number of times (for example, 10 times), an execution permission message or an execution prohibition message cannot be received from the management process 13A, the process execution controller 112 may request the process generator 101 to stop generating the startup process 13B. Furthermore, in the case where information identifying the process 13, such as the pid thereof, and included in the message for inquiring whether the startup process 13B is permitted to be executed differs from information identifying the process 13 and included in the execution permission message or the execution prohibition message, the process execution controller 112 may stop the startup process 13B.

As described above, according to the present modification, when communications are carried out between the OS 12 and the management process 13A that performs the white list execution control, a message authentication code is generated using the same message authentication key for the OS 12 and the management process 13A, and a message is verified using the message authentication code. Thus, a security function for communications between the OS 12 and the management process 13A can be implemented, thereby protecting the management process 13A. Furthermore, since the safety of communications between the OS 12 and the management process 13A is ensured, the white list execution control for the startup process 13B can be appropriately carried out.

Second Embodiment

Next, a second embodiment is described. The present embodiment is such that, using not only a base address for mapping an execution file of the process 13 to a memory, but also a random value that the OS 12 has written in a specific memory space shared between the OS 12 and the process 13 during startup of the process 13, the same message authentication key is generated in the OS 12 and the process 13, whereby secure communications between the OS 12 and the process 13 are implemented.

The memory space is usually an approximately $2^{64}$ or $2^{32}$ space. In addition, the memory space in which the OS 12 sets a base address of the execution file is limited. Therefore, the above-mentioned first embodiment and the modification thereof have a problem in the information entropy of a message authentication key. In contrast, according to the present embodiment, a message authentication key is generated by adding the random value to the base address, whereby the information entropy can be increased and it becomes difficult to infer a message authentication key.

Figure 14:
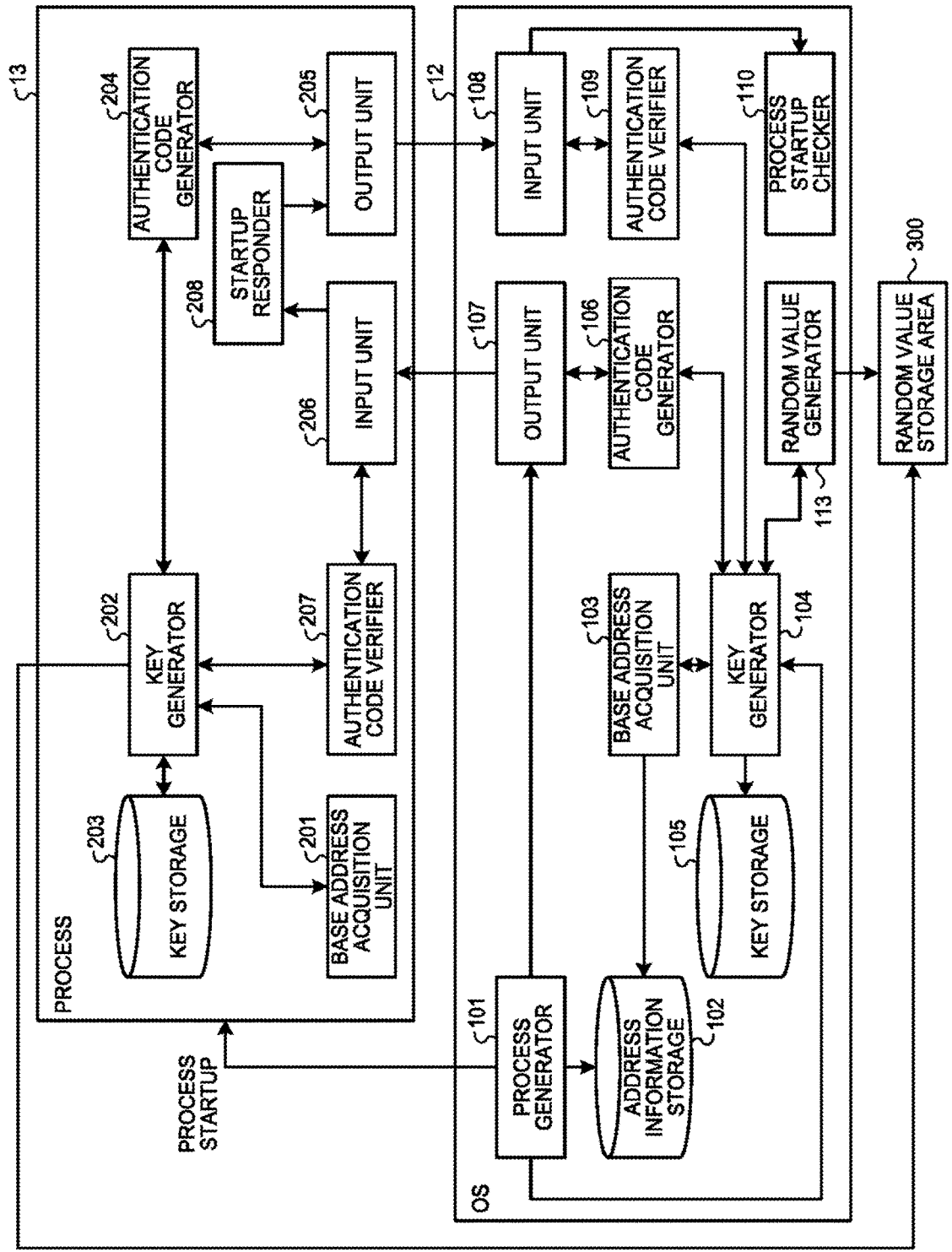
FIG. 14 is a block diagram illustrating a functional configuration example of an OS and a process according to a second embodiment.

FIG. 14 is a block diagram illustrating a functional configuration example of the OS 12 and the process 13 according to the present embodiment. Compared with the configuration example illustrated in FIG. 2, a random value generator 113 is added to the OS 12, and the key generator 104 of the OS 12 is configured so as to generate the same message authentication key as that of the process 13 by using a base address acquired by the base address acquisition unit 103 and a random value generated by the random value generator 113. Furthermore, the key generator 202 of the process 13 is configured so as to read a random value from a random value storage area 300 in which the random value generated by the random value generator 113 is stored, and generate the same message authentication key as that of the OS 12 by using a base address acquired by the base address acquisition unit 201 and the random value read from the random value storage area 300.

According to the present embodiment, before requesting the output unit 107 to transmit a message, the process generator 101 of the OS 12 requests the key generator 104 to generate a random value. This random value generation request may be made at the same time as when the authentication code generator 106 and the authentication code verifier 109 request the key generator 104 to generate a message authentication key. When receiving the random value generation request, the key generator 104 requests the random value generator 113 to generate a random value. As a method by which the random value generator 113 generates a random value, the random value generator 113 may make use of a fixed value stored beforehand in the OS 12, a physically unclonable function (PUF), or a pseudo-random number generation function that uses a password as a seed, or may make use of the rdrand instruction of an Intel (registered trademark) CPU or a random value generation function of a HW module, such as HSM or TPM.

The random value generator 113 passes a generated random value to the key generator 104, and stores the random value in the random value storage area 300 on a memory. The random value storage area 300 is a specific memory space uniquely determined from the base address of an execution file of the process 13. Alternatively, the random value storage area 300 may be a memory space determined from a segment register, such as DS, FS, or GS. The key generator 104 executes a key derivation function by using, as a seed, a value calculated from the base address received from the base address acquisition unit 103 and the random value received from the random value generator 113, and thereby generates the same message authentication key as that of the process 13.

On the other hand, according to a request from the authentication code generator 204 or the authentication code verifier 207, the key generator 202 of the process 13 generates the same message authentication key as that of the OS 12. When requested to generate the message authentication key, the key generator 202 acquires a random value from the random value storage area 300, and executes a key derivation function by using, as a seed, a value calculated from the acquired random value and the base address acquired by the base address acquisition unit 201, and thereby generates the same message authentication key as that of the OS 12. Note that processing, such as generation of a message authentication code by using a message authentication key and verification of a message by using the message authentication code, is the same as that in the above-mentioned first embodiment, and a detailed description thereof is therefore omitted.

As described above, according to the present embodiment, the same message authentication key is generated in the OS 12 and the process 13 by using not only a base address for mapping an execution file of the process 13 to a memory, but also a random value that the OS 12 has written in a specific memory space shared between the OS 12 and the process 13 during startup of the process 13. This makes it difficult to infer the message authentication key, and thus, the safety of communications between the OS 12 and the process 13 can be enhanced.

Third Embodiment

Next, a third embodiment is described. In the present embodiment, a function to output a log when an abnormality is found during message verification is added. With this additional function to output a log, the occurrence of unexpected communications can be detected, and the cause can be analyzed. Furthermore, based on the analysis of a log, countermeasures, such as stop of a process that becomes the cause and resending of a message, may be taken.

Figure 15:
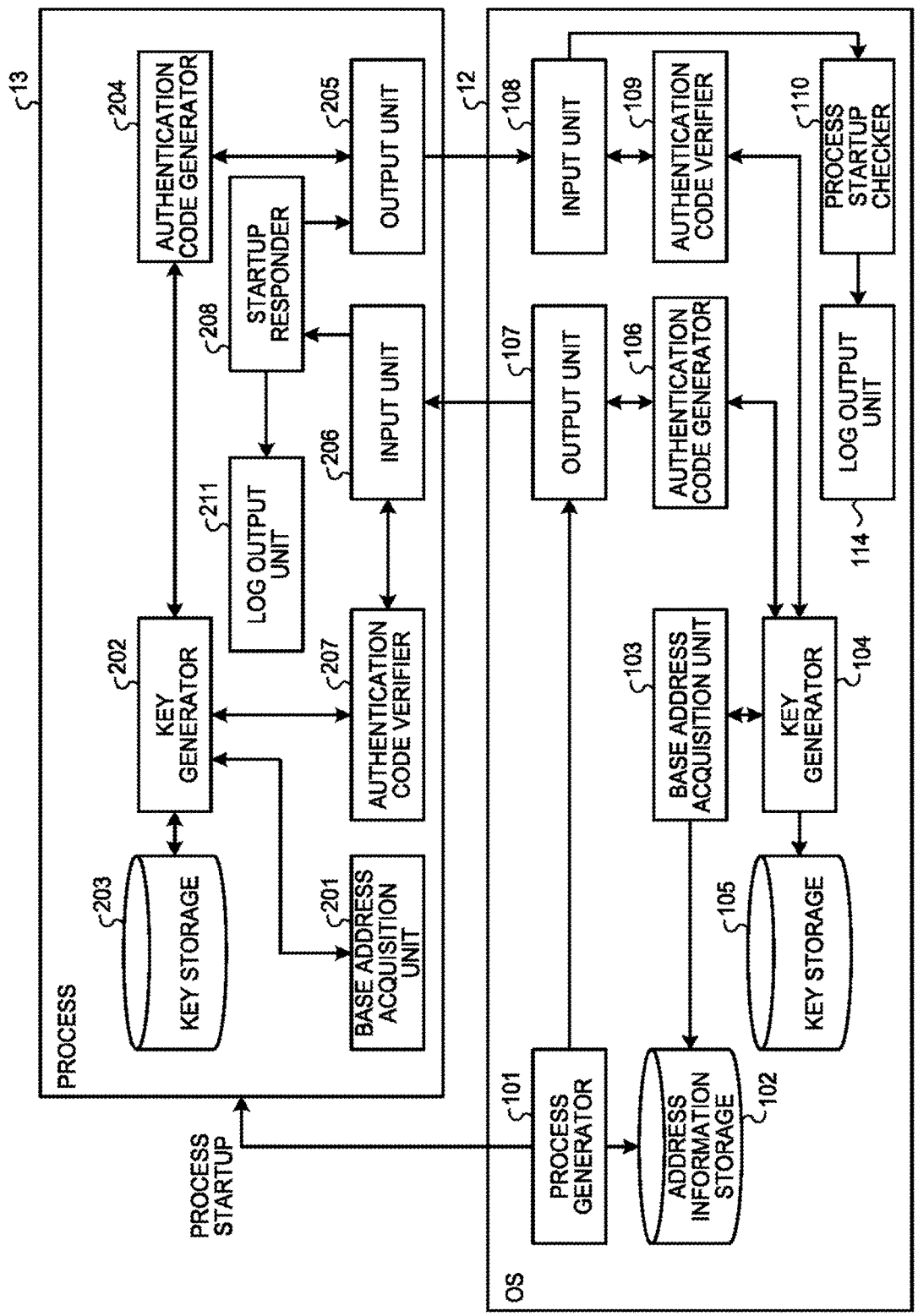
FIG. 15 is a block diagram illustrating a functional configuration example of an OS and a process according to a third embodiment.

FIG. 15 is a block diagram illustrating a functional configuration example of the OS 12 and the process 13 according to the present embodiment. Compared with the configuration example illustrated in FIG. 2, a log output unit 114 is added to the OS 12, whereas a log output unit 211 is added to the process 13.

The log output unit 211 the process 13 receives, from the startup responder 208, a message and the result of the verification of the message by the authentication code verifier 207, and controls the output of a log, based on the received message and the received verification result. For example, when message falsification or masquerade is found from the verification result, the log output unit 211 outputs a log indicating the falsification or masquerade to a file. Alternatively, the log may not be output, but stored in the inside of the process 13, may be transmitted to a process 13 or to another OS 12 that operates on the information processing apparatus 10 by another process 13 or a virtualization function, or may be transmitted terminals, a PC, a server, a printer, or an electronic device on an external network, by using a wireless or wire communication means. Furthermore, the log may be encrypted or associated with a signature. The form of the log is not limited to a character string, may be another form, such as an image or a video, or may be compressed into a form, such as 7z, ZIP, RAP, LZH, ISO, TAR, DMG, or MSI. The log may be not output immediately after generated, but output after the elapse of a predetermined time. After the elapse of a predetermined time, the log may be output together with another log. Furthermore, the generated log may be read, and based on the result of the log, new processing may be executed. For example, based on the log, there may be executed processing, such as stop of a process 13 that has failed in communications, enhanced monitoring of a process 13 that has failed in communications by using ptrace or other tools, and isolation of such a process 13 by using a virtualization technique such as a container.

When receiving a message about a startup failure from the process 13, the log output unit 114 of the OS 12 outputs a log indicating the startup failure to a file. Such log indicating a startup failure can be used to verify an abnormality in the information processing apparatus 10. When receiving a message about a startup success from the process 13, the log output unit 114 of the OS 12 outputs a log indicating the startup success to a file. As is the case with the log output by the log output unit 211 of the process 13, the log output by the log output unit 114 of the OS 12 may be compressed or encrypted, and the output destination may be any device. Furthermore, based on a log output by the log output unit 114, the OS 12 may select processing to be executed. For example, in the case where a log indicating a failure in the startup of the process 13 is recorded on a file to which the log output unit 114 outputs the log, the OS 12 may forcibly terminate the process 13. In the case where a log indicating repeated failures in the startup of the process 13 is recorded on a file to which the log output unit 114 outputs the log, the OS 12 may restart itself. With this configuration, based on the log, the OS 12 can detect that the information processing apparatus 10 is in an abnormal state, and can implement measures so that the information processing apparatus 10 recovers from the abnormal state.

As described above, according to the present embodiment, a log is output when an abnormality is found during message verification, and thus, the occurrence of unexpected communications can be detected, and the cause can be analyzed.

Fourth Embodiment

Next, a fourth embodiment is described. According to the present embodiment, during startup of the process 13, the OS 12 writes a message authentication key in a specific memory space shared with the processes 13, so that the process 13 can acquire this message authentication key. The message authentication key may be embedded beforehand in the OS 12 or may be generated during execution of the process 13. In the case where the message authentication key is generated during execution of the process 13, the message authentication key may be generated, for example, by using the time of startup of the process 13 as a seed, and using key derivation functions, such as PBKDF2 and Argon2, or using such functions in combination. As the seed, use may be made of a PUF, the base address of an execution file, a password, the rdrand instruction of an Intel (registered trademark) CPU, or a value generated by a random value generation function of a HW module, such as HSM or TPM, or these may be used in combination. Alternatively, instead of generating a message authentication key by using a key derivation function, a message authentication key may be acquired from a process 13 or from another OS 12 that operates on the information processing apparatus 10 by another process 13 or a virtualization function, or a message authentication key may be acquired from other terminals, a PC, a server, a printer, or an electronic device on an external network, by using a wireless or wire communication means.

Figure 16:
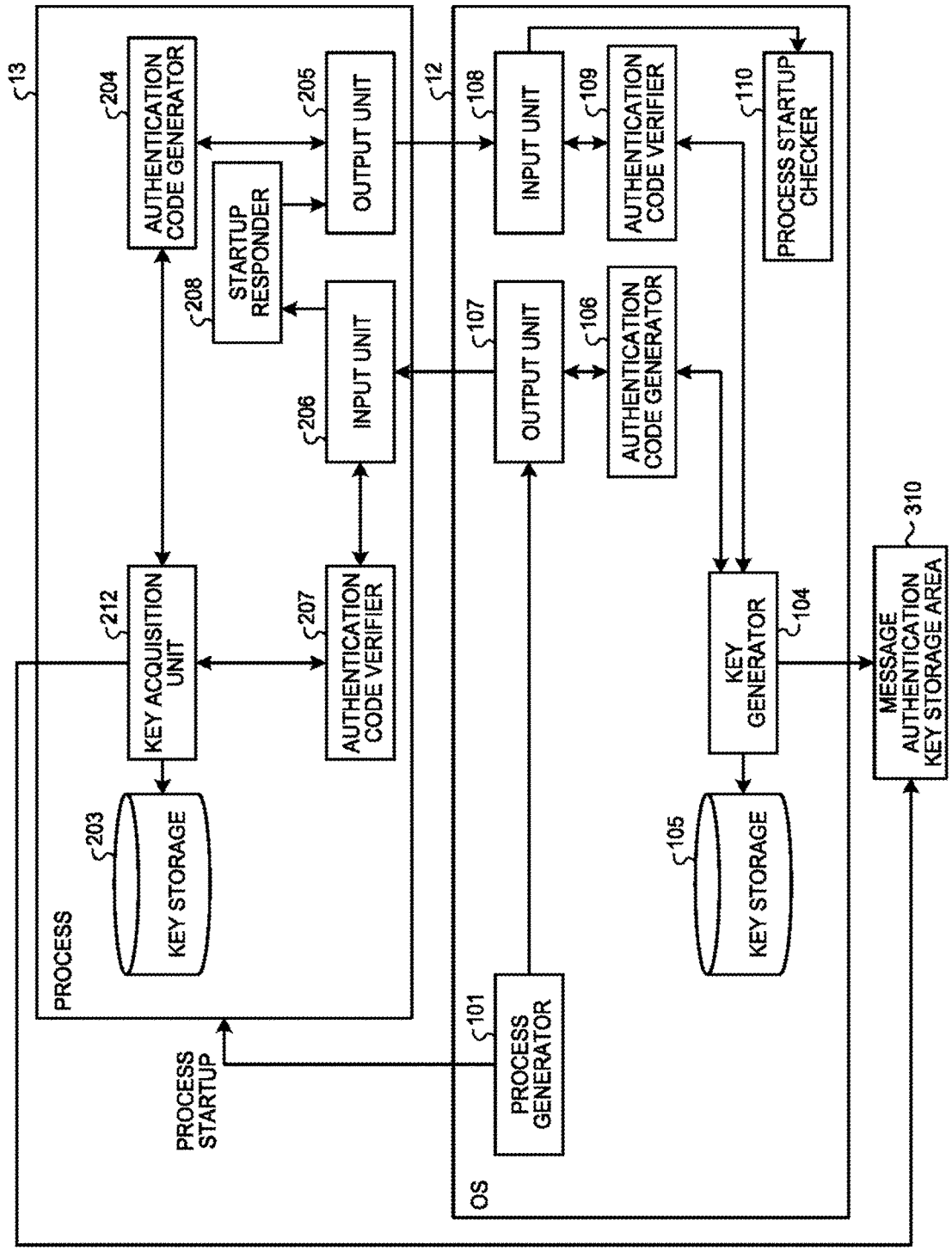
FIG. 16 is a block diagram illustrating a functional configuration example of an OS and a process according to a fourth embodiment.

FIG. 16 is a block diagram illustrating a functional configuration example of the OS 12 and the process 13 according to the present embodiment. Compared with the configuration example illustrated in FIG. 2, it is configured such that the OS 12 does not include the address information storage 102 and the case address acquisition unit 103, and the key generator 104 of the OS 12 generates or acquires a message authentication key by the above-described method and stores the message authentication key in the key storage 105 and a message authentication key storage area 310. Furthermore, the process 13 does not include the base address acquisition unit 201, and the key generator 202 is replaced with a key acquisition unit 212.

According to a request from the authentication code generator 204 or the authentication code verifier 207, the key acquisition unit 212 of the process 13 acquires a message authentication key from the message authentication key storage area 310. The message authentication key storage area 310 is a specific memory space uniquely determined from the base address of an execution file of the process 13, wherein the message authentication key generated or acquired by the key generator 104 of the OS 12 is stored. Note that, processing, such as generation of a message authentication code by using the message authentication key and verification of a message by using a message authentication code, is the same as that in the above-mentioned first embodiment, and a detailed description thereof is therefore omitted.

As described above, according to the present embodiment, a message authentication key is stored in the specific memory space uniquely determined from a base address, that is, process unique data assigned to the process 13 by the OS 12, and, when communications are carried out between the OS 12 and the process 13, a message authentication code is generated using this message authentication key and a message is verified using the message authentication code. Thus, as is the case in the above-mentioned first embodiment, a security function for communications between the OS 12 and the process 13 can be implemented, thereby protecting the process 13.

Furthermore, the present embodiment offers a higher flexibility in generation of a message authentication key than the first embodiment, and therefore, a message authentication key that is difficult to infer can be generated, whereby a higher level of safety of communications between the OS 12 and the process 13 can be achieved.

Fifth Embodiment

Next, a fifth embodiment is described. The present embodiment is an example of implementing a security function for communications between a VMM and the OS 12. The VMM may be a hypervisor, or may have any format and form so long as the VMM has a function to manage a plurality of the OSs 12. A plurality of the OSs 12 may operate. According to the present embodiment, the VMM generates the same message authentication key as that of the OS 12, and writes the message authentication key into a virtual device for the exclusive use of the OS 12, whereby the OS 12 can acquire this message authentication key. Furthermore, when communications are carried cut between the VMM and the OS 12, a message authentication code is generated using this message authentication key and a message is verified using the message authentication code, whereby the communications between the VMM and the OS 12 are made secure.

The present embodiment is configured such that the process 13 in the above-described fourth embodiment is replaced with the OS 12, and the OS 12 in the above-described fourth embodiment is replaced with the VMM. In other words, the VMM can be regarded as a "process manager" for managing the OS 12 as a process, whereas the OS 12 can be regarded as a "process" in the relation between the OS 12 and the VMM. Note that, in the above-described fourth embodiment, the OS 12 stores a message authentication key in the specific memory space shared with t process 13, whereas, in the present embodiment, the VMM stores a message authentication key in a virtual device for the exclusive use of the OS 12.

Figure 17:
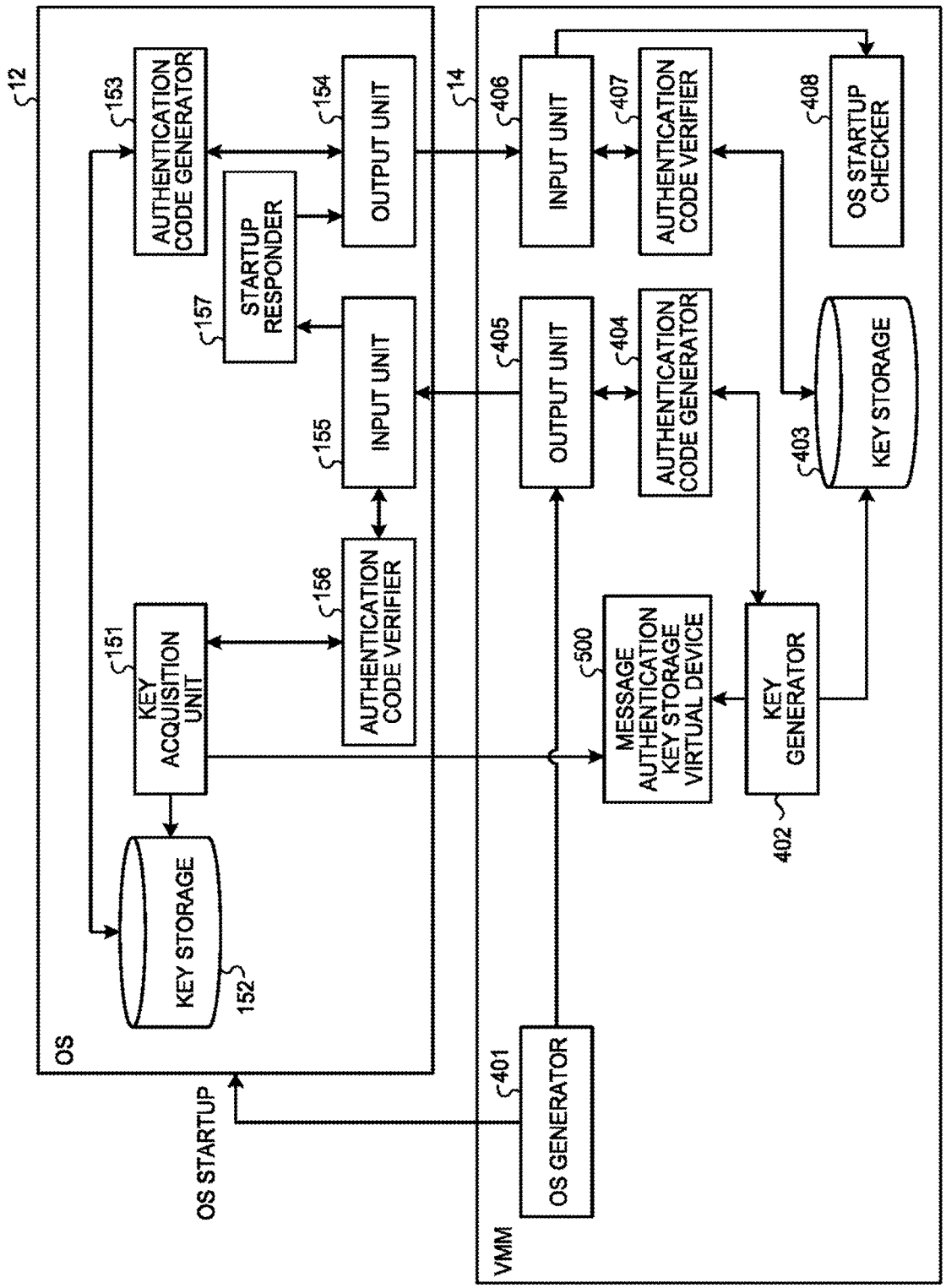
FIG. 17 is a block diagram illustrating a functional configuration example of a VMM and an OS according to a fifth embodiment.

FIG. 17 is a block diagram illustrating a functional configuration example of the VMM and the OS 12 according to the present embodiment. A VMM 14 includes an OS generator 401 configured to generate and start the OS 12, a key generator 402 configured to generate a message authentication key and store the message authentication key in a key storage 403 and a message authentication key storage virtual device 500, a key storage 403 configured to store the message authentication key generated by the key generator 402, an authentication code generator 404 configured to generate a message authentication code by using the message authentication key, an output unit 405 configured to transmit to a message assigned with the message authentication code to the OS 12, an input unit 406 configured to receive the message assigned with the message authentication code from the OS 12, an authentication code verifier 407 configured to verify the message received from the OS 12 by using the message authentication key, and an OS startup checker 408 configured to check startup of the OS 12, based on the message received from the OS 12. As mentioned above, the message authentication key storage virtual device 500 is a virtual device for the exclusive use of the OS 12.

The OS 12 includes a key acquisition unit 151 configured to acquire the message authentication key from the message authentication key storage virtual device 500 and store the message authentication key in a key storage 152, the key storage 152 configured to store the message authentication key acquired by the key acquisition unit 151, an authentication code generator 153 configured to generate a message authentication code by using the message authentication key, an output unit 154 configured to transmit a message assigned with the message authentication code to the VMM 14, an input unit 155 configured to receive the message assigned with the message authentication code from the VMM 14, an authentication code verifier 156 configured to verify the message received from the VMM 14 by using the message authentication hey, and a startup responder 157 configured to respond to an inquiry from the VMM 14 about whether the startup of the OS 12 has succeeded. An example of the startup response is such that, in the case of a startup success, the OS 12 transmits a message with a character string "success" to the VMM 14, whereas, in the case of a startup failure, the OS 12 transmits a message with a character string "fail" to the VMM 14. The contents and format of this message do not matter, so long as whether the startup has succeeded or failed can be distinguished by this message. Note that, although FIG. 17 illustrates only one OS 12, a plurality of the OSs 12 may communicate with the VMM 14.

Next, assuming a situation in which the VMM 14 transmits a startup check message to the OS 12 during startup of the OS 12, and as a response thereto, the OS 12 transmits a startup response message to the VMM 14, the operation of the information processing apparatus 10 according to the present embodiment is described following a flowchart.

Figure 18:
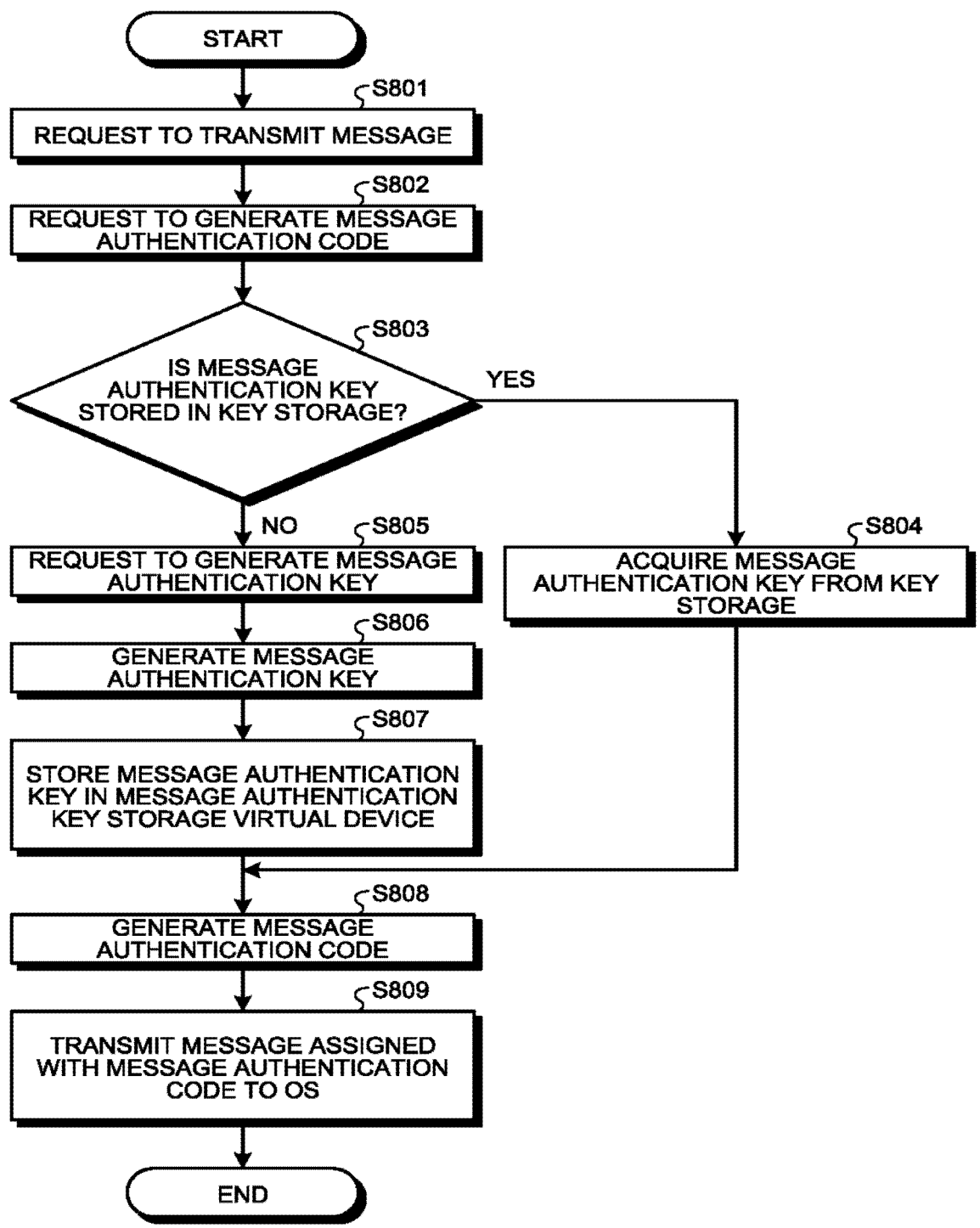
FIG. 18 is a flowchart illustrating an example of a processing procedure in the VMM during message transmission.

First, processing performed during message transmission from the VMM 14 to the OS 12 is described. FIG. 18 is a flowchart illustrating an example of a processing procedure in the VMM 14 during the message transmission.

First, in order to check whether the OS 12 generated by itself has started up normally, the OS generator 401 passes osid, that is, identification information of the generated OS 12, to the output unit 405, and requests the output unit 405 to transmit a message (Step S601). Note that the message transmission request may be made when the OS 12 starts up or the OS 12 issues a hypercall. Alternatively, the message transmission request may be made when an interrupt from the hardware 11 occurs or the condition of the hardware 11 is changed, or the message transmission request may be made at an arbitrary timing or by an arbitrary operation. Alternatively, it is assumed herein that the osid of the OS 12 is used as a startup check message, but, other information capable of identifying the OS 12 may be used instead of the osid. Furthermore, in addition to the osid or information as a substitute for the osid, the startup check message may include context information, such as a startup time of the OS 12 and positional information of the information processing apparatus 10.

In order to make message transmission from the VMM 14 to the OS 12 secure, the output unit 405 passes, to the authentication code generator 404, a message to be transmitted to the OS 12 serving as a communication target, and requests the authentication code generator 404 to generate a message authentication code (Step S802). The authentication code generator 404 checks first whether a message authentication key corresponding to the communication target OS 12 is stored in the key storage 403 (Step S803). Here, if the message authentication key corresponding to the communication target OS 12 is stored in the key storage 403 (Yes at Step S803), the authentication code generator 404 acquires the message authentication key from the key storage 403 (Step S604).

In contrast, if the message authentication key corresponding to the communication target OS 12 is not stored in the key storage 403 (No at Step S803), the authentication code generator 404 requests the key generator 402 to generate a message authentication key (Step S805). The key generator 402 generates a message authentication key by using a predetermined key derivation function (Step S806), and returns the generated message authentication key to the authentication code generator 404 and stores the message authentication key in the key storage 403. Furthermore, the key generator 402 stores the generated message authentication key in the message authentication key storage virtual device 500, that is, a virtual device unique to the communication target OS 12 (Step S807).

The message authentication key storage virtual device 500 is characterized in that, even when a plurality of the OSs 12 are in operation on the VMM 14, only the communication target OS 12 can be referred to, and other OSs 12 cannot be referred to. As a seed for the key derivation function, the time of startup of the OS 12 can be used, for example. Alternatively, as the seed, use may be made of a PUF, the base address of an execution file, a password, the rdrand instruction of an Intel (registered trademark) CPU, or a value generated by a random value generation function of a HW module, such as HSM or TPM, or these may be used in combination. Alternatively, instead of generating a message authentication key by using a key derivation function, a message authentication key may be acquired from a process 13 or from another OS 12 that operates on the information processing apparatus 10 by another process 13 or a virtualization function, or the message authentication key may be acquired from other terminals, a PC, a server, printer, or an electronic device on an external network, by using a wireless or wire communication means.

Next, the authentication code generator 404 generates a message authentication code by using the message received from the output unit 405 at Step S802, and the message authentication key acquired from the key storage 403 at Step S804 or the message authentication key generated by the key generator 402 at Step S806 (Step S808). The authentication code generator 404 then assigns the generated message authentication code to the message, and returns the message to the output unit 405. At this time, the message may be encrypted using the message authentication key. The output unit 405 transmits, to the communication target OS 12, the message assigned with the message authentication code and received from the authentication code generator 404 (Step S809).

Figure 19:
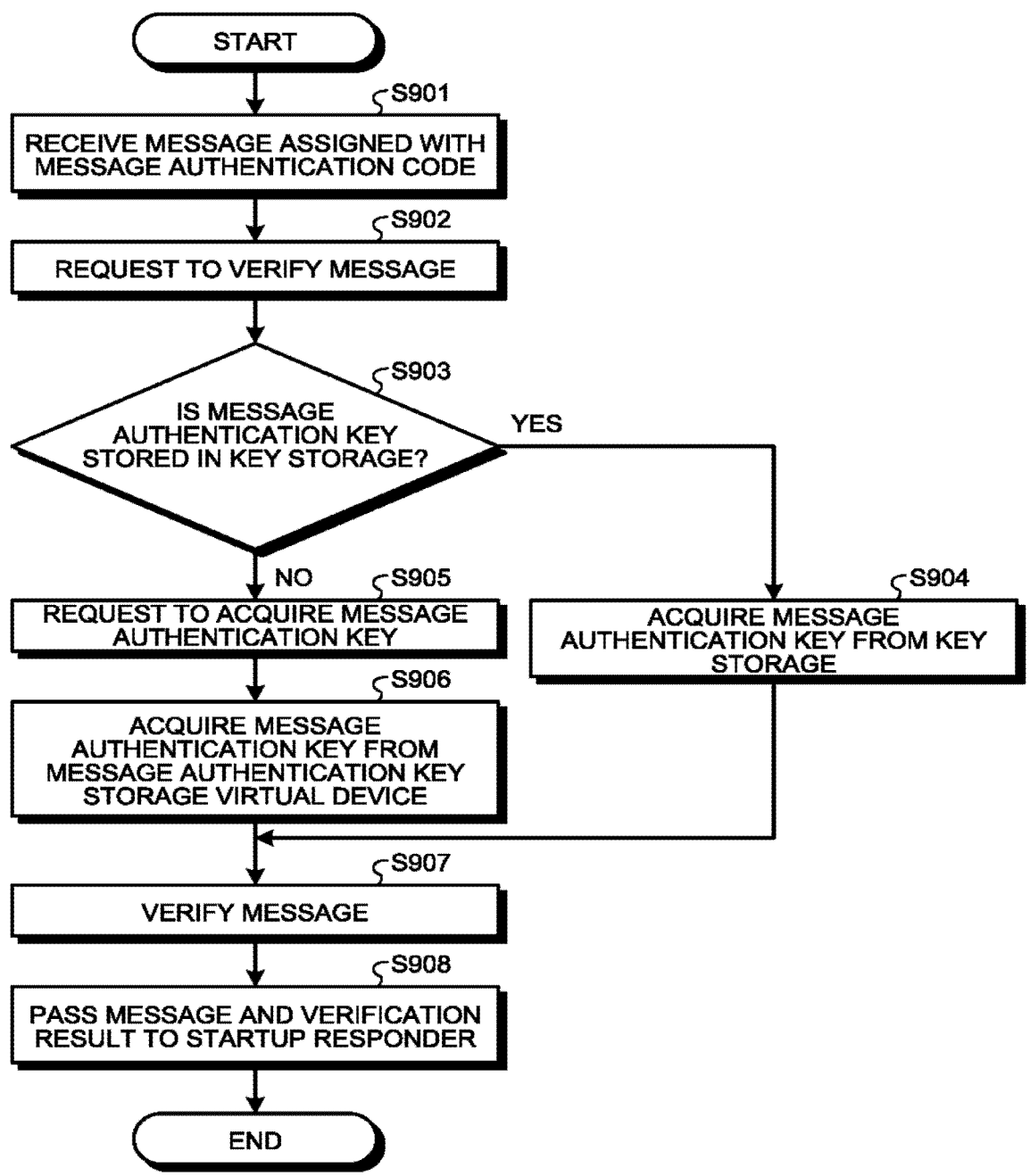
FIG. 19 is a flowchart illustrating an example of a processing procedure in the OS during message reception.

Next, processing performed when the OS 12 receives a message from the VMM 14 is described. FIG. 19 is a flowchart illustrating an example of a processing procedure in the OS 12 during the message reception.

When the input unit 155 of the OS 12 receives the message assigned with the message authentication code and transmitted from the output unit 405 of the VMM 14 (Step S901), the input unit 155 passes the message assigned with the message authentication code to the authentication code verifier 156 and requests the authentication code verifier 156 to verify the message in order to check the safety of the received message (Step S902). The authentication code verifier 156 checks first whether the message authentication key generated by the VMM 14 is stored in the key storage 152 (Step S903). Here, if the message authentication key generated by the VMM 14 is stored in the key storage 152 (Yes at Step S903), the authentication code verifier 156 acquires the message authentication key from the key storage 152 (Step S904).

In contrast, if the message authentication key generated by the VMM 14 is not stored in the key storage (No at Step S903), the authentication code verifier 156 requests the key acquisition unit 151 to acquire a message authentication key (Step S905). According to the request from the authentication code verifier 156, the key acquisition unit 151 acquires a message authentication key from the message authentication key storage virtual device 500 (Step S906), and returns the acquired message authentication key to the authentication code verifier 156 and stores the message authentication key in the key storage 152.

Next, using the message authentication code assigned to the message received from the input unit 155 at Step S902, and the message authentication key acquired from the key storage 152 at Step S904 or the message authentication key acquired by the key acquisition unit 151 at Step S906, the authentication code verifier 156 verifies t message received from the input unit 155 at Step S902 (Step S907). Specifically, for example, using the message authentication key, the authentication code verifier 156 generates a message authentication code, based on the message received from the input unit 155, and checks whether the generated message authentication code matches the message authentication code assigned to the message, thereby checking whether the message received by the input unit 155 is proper data transmitted by the VMM 14, and thus detects message falsification and masquerade. Note that, in the case where the message has been encrypted at the time of the verification, the message may be decoded with the message authentication key.

The authentication code verifier 156 returns, to the input unit 155, the result of the verification of the message received by the input unit 155. When receiving the verification result from the authentication code verifier 156 the input unit 155 passes the message and the verification result to the startup responder 157 (Step S908).

Figure 20:
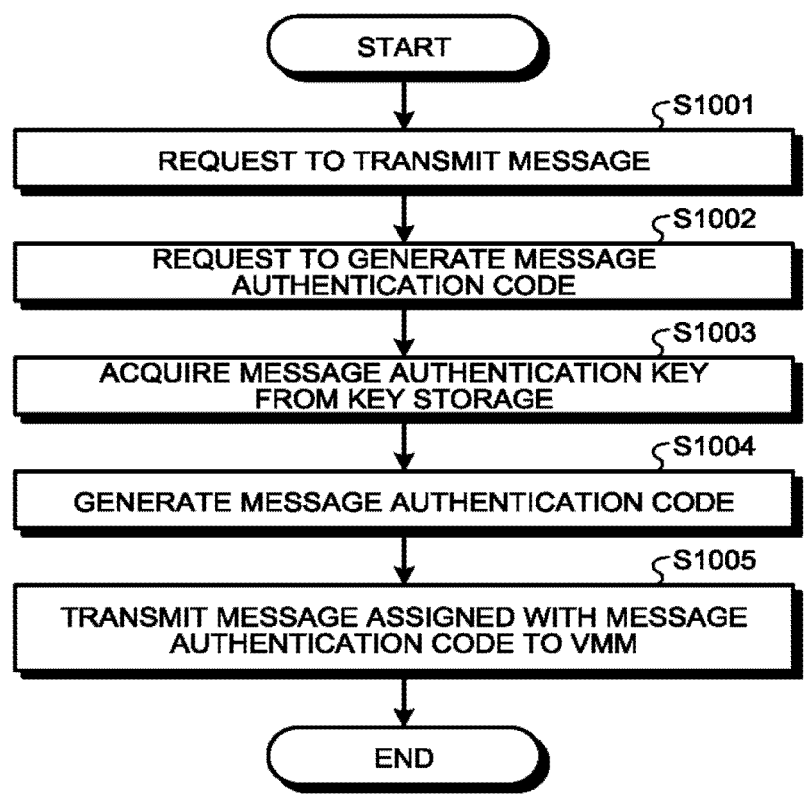
FIG. 20 is a flowchart illustrating an example of a processing procedure in the OS during message transmission.

Next, processing performed during message transmission from the OS 12 to the VMM 14 is described. FIG. 20 is a flowchart illustrating an example of a processing procedure in the OS 12 during the message transmission.

First, in order to notify the VMM 14 whether the OS 12 has started up normally, the startup responder 157 passes, to the output unit 154, the osid of the OS 12 and information on the success or failure of the startup of the OS 12, and requests the output unit 154 to transmit a message (Step S1001).

In order to make message transmission from the OS 12 to the VMM 14 secure, the output unit 154 passes a message to be transmitted the VMM 14 to the authentication code generator 153, and requests the authentication code generator 153 to generate a message authentication code (Step S1002). In the same manner as the above-mentioned authentication code verifier 156, the authentication code generator 153 checks first whether a message authentication key generated by the VMM 14 is stored in the key storage 152. Here, during the reception of the startup check message, a message authentication key is acquired from the message authentication key storage virtual device 500 by the key acquisition unit 151, and stored in the key storage 152. Therefore, the authentication code generator 153 acquires the message authentication key from the key storage 152 (Step S1003).

Next, the authentication code generator 153 generates a message authentication code by using the message received from the output unit 154 at Step S1002 and the message authentication key acquired from the key storage 152 at Step S1003 (Step S1004). The authentication code generator 153 then assigns the generated message authentication code to the message, and returns the message to the output unit 154. At this time, the message may be encrypted using the message authentication key. The output unit 154 transmits, to the VMM 14, the message assigned with the message authentication code and received from the authentication code generator 153 (Step S1005).

Figure 21:
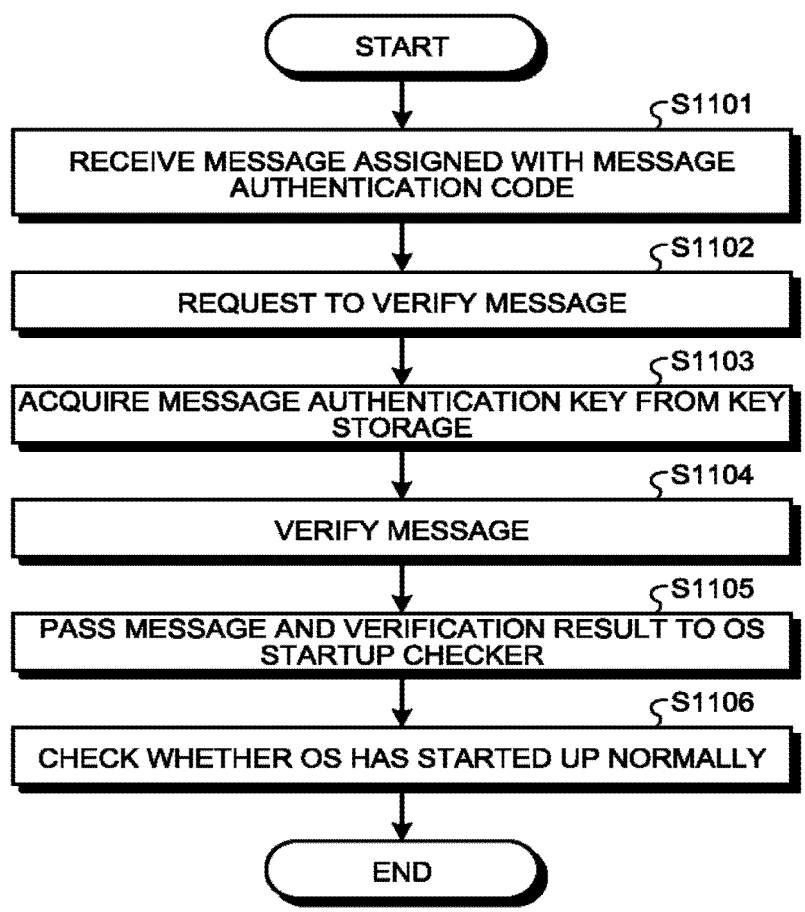
FIG. 21 is a flowchart illustrating an example of a processing procedure in the VMM during message reception.

Next, processing performed when the VMM 14 receives a message from the OS 12 is described. FIG. 21 is a flowchart illustrating an example of a processing procedure in the VMM 14 during the message reception.

When the input unit 406 of the VMM 14 receives the message assigned with the message authentication code and transmitted from the output unit 154 of the OS 12 (Step S1101), the input unit 406 passes the message assigned with the message authentication code to the authentication code verifier 407 and requests the authentication code verifier 407 to verify the message in order to check the safety of the received message (Step S1102). In the same manner as the above-described authentication code generator 404, the authentication code verifier 407 checks first whether the message authentication key corresponding to the OS 12 targeted for communication is stored in the key storage 403. Here, during the transmission of the startup check message, the message authentication key is generated and stored in the key storage 403. Therefore, the authentication code verifier 407 acquires the message authentication key from the key storage 403 (Step S1103).

Next, using the message authentication code assigned to the message received from the input unit 406 at Step S1102 and the message authentication key acquired from the key storage 403 at Step S1103, the authentication code verifier 407 verifies the message received from the input unit 406 at Step S1102 (Step S1104). Specifically, for example, using the message authentication key, the authentication code verifier 407 generates a message authentication code, based on the message received from the input unit 406, and checks whether the generated message authentication code matches the message authentication code assigned to the message, thereby checking whether the message received by the input unit 406 is proper data transmitted by the OS 12, and thus detects message falsification and masquerade. Note that, in the case where the message has been encrypted at the time of the verification, the message may be decoded with the message authentication key. Furthermore, in addition to the verification by the authentication code verifier 407, processing for detecting message falsification and masquerade may be carried out by checking whether information identifying the OS 12, such as the osid thereof, and included in the message transmitted by the output unit 405 matches information identifying the OS 12, such as the osid thereof, and included in the message transmitted from the OS 12 as a response to the above-mentioned message and received by the input unit 406.

The authentication code verifier 407 returns, to the input unit 406, the result of the verification of the message received by the input unit 406. When receiving the verification result from the authentication code verifier 407, the input unit 406 passes the message and the verification result to the OS startup checker 408 (Step S1105). Based on the message and the verification result received from the input unit 406, the OS startup checker 408 checks whether the OS 12 generated by the OS generator 401 has started up normally (Step S1106).

As described above in detail by using specific examples, according to the present embodiment, a message authentication key generated by the VMM 14 is stored in the message authentication key storage virtual device 500, that is, a virtual device assigned to the OS 12 by the VMM 14 for the exclusive use of the OS 12, so that the OS 12 can acquire this message authentication key. Furthermore, when communications are carried out between the VMM 14 and the OS 12, a message authentication code is generated using this message authentication key, and a message is verified using the message authentication code. Thus, a security function for communications between the VMM 14 and the OS 12 can be implemented, thereby protecting the OS 12.

Supplementary Explanation

The functions of the OS 12, the process 13, and the VMM 14 in the information processing apparatus 10 in each of the above-described embodiments may be implemented, for example, as a program for software executed by a processor circuit mounted in the information processing apparatus 10 as the hardware 11. At this time, in the information processing apparatus 10 in each of the above-described embodiments, the functions of the OS 12, the process 13, and the VMM 14 may be implemented by installing beforehand the above-mentioned computer program, or alternatively the functions of the OS 12, the process 13, and the VMM 14 may be implemented by appropriately installing the above-mentioned computer program that is recorded on a recording medium or distributed through a network.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An information processing apparatus comprising:
   one or more processor circuits configured to run a process and a process manager to manage the process, wherein the process comprises:
   a first key generator configured to generate a first message authentication key by using process unique data assigned to the process by the process manager,
   a first authentication code generator configured to generate a first message authentication code by using the first message authentication key and a first message, and
   a first output unit configured to transmit the first message and the first message authentication code to the process manager, wherein
   the process unique data is a base address indicating a location on a memory to which an execution file of the process is mapped, and
   the first key generator generates the first message authentication key by using the base address and a predetermined key derivation function; and
   the process manager comprises:
   a second key generator configured to generate a second message authentication key by using the process unique data;
   a second input unit configured to receive the first message and the first message authentication code from the process;
   a second authentication code verifier configured to verify the first message by using the second message authentication key and the first message authentication code;
   a second authentication code generator configured to generate a second message authentication code by using the second message authentication key and the second message; and
   a second output unit configured to transmit the second message and the second message authentication code to the process, wherein
   the process is a management process to control execution of another process,
   the second message includes information identifying the other process,
   the management process further comprises an execution determiner configured to determine whether to permit execution of the other process, based on the second message and a list of execution files of processes permitted to be executed, and
   the first message includes a result of determination by the execution determiner.

2. The apparatus according to claim 1, wherein the first key generator generates the first message authentication key by inputting, into the key derivation function, data generated from the base address and a random number stored in a memory space identified based on the base address.

3. The apparatus according to claim 1, wherein the process further comprises
   a first input unit configured to receive a second message and a second message authentication code from the process manager, and
   a first authentication code verifier configured to verify the second message by using the first message authentication key and the second message authentication code.

4. The apparatus according to claim 3, wherein the process further comprises a log output unit configured to output a log that, when an abnormality of the second message is detected by the first authentication code verifier, indicates the abnormality.

5. The apparatus according to claim 1, wherein the process manager further comprises a process execution controller configured to control execution of the other process, based on a determination result included in the first message.

6. The apparatus according to claim 5, wherein
   the first message further includes information identifying the other process, and
   the process execution controller stops the other process when information included in the first message and identifying the other process differs from information included in the second message and identifying the other process.

7. An information processing method that is executed in an information processing apparatus comprising one or more processor circuits configured to run a process and a process manager to manage the process, the method comprising:
   generating, by the process, a first message authentication key by using process unique data assigned to the process by the process manager;
   generating, by the process, a first message authentication code by using the first message authentication key and a first message; and
   transmitting, by the process, the first message and the first message authentication code to the process manager, wherein
   the process unique data is a base address indicating a location on a memory to which an execution file of the process is mapped,
   the first message authentication key is generated by using the base address and a predetermined key derivation function, and
   the method further comprises:
   generating, by the process manager, a second message authentication key by using the process unique data;
   receiving, by the process manager, the first message and the first message authentication code from the process;
   verifying, by the process manager, the first message by using the second message authentication key and the first message authentication code;

generating, by the process manager, a second message authentication code by using the second message authentication key and the second message; and transmitting, by the process manager, the second message and the second message authentication code to the process, wherein the process is a management process to control execution of another process, the second message includes information identifying the other process, the management process further comprises determining whether to permit execution of the other process, based on the second message and a list of execution files of processes permitted to be executed, and the first message includes a result of determination at the determining.

8. A computer program product comprising a non-transitory computer readable medium including programmed instructions, wherein the instructions, when executed in an information processing apparatus comprising one or more processor circuits configured to run a process and a process manager to manage the process, cause the process to implement:

a function to generate a first message authentication key by using process unique data assigned to the process by the process manager;

a function to generate a first message authentication code by using the first message authentication key and a first message; and a function to transmit the first message and the first message authentication code to the process manager, wherein the process unique data is a base address indicating a location on a memory to which an execution file of the process is mapped, the first message authentication key is generated by using the base address and a predetermined key derivation function, and the instructions cause the process manager to implement:

a function to generate a second message authentication key by using the process unique data;

a function to receive the first message and the first message authentication code from the process;

a function to verify the first message by using the second message authentication key and the first message authentication code;

a function to generate a second message authentication code by using the second message authentication key and the second message; and a function to transmit the second message and the second message authentication code to the process, wherein the process is a management process to control execution of another process, the second message includes information identifying the other process, the management process further comprises a function to determine whether to permit execution of the other process, based on the second message and a list of execution files of processes permitted to be executed, and the first message includes a result of determination by the function to determine.

* * * * *